(12) United States Patent
Reese et al.

(10) Patent No.: US 12,468,179 B2
(45) Date of Patent: Nov. 11, 2025

(54) COMPUTER-IMPLEMENTED METHOD FOR CALCULATING A DIGITAL TWIN OF A SPECTACLE LENS

(71) Applicant: Carl Zeiss Vision International GmbH, Aalen (DE)

(72) Inventors: Martin Reese, Aalen (DE); Christoph Menke, Oberkochen (DE)

(73) Assignee: Carl Zeiss Vision International GmbH, Aalen (DE)

(*) Notice: Subject to any disclaimer, the term of this patent is extended or adjusted under 35 U.S.C. 154(b) by 0 days.

(21) Appl. No.: 19/191,092

(22) Filed: Apr. 28, 2025

(65) Prior Publication Data

US 2025/0251617 A1 Aug. 7, 2025

Related U.S. Application Data

(63) Continuation of application No. PCT/EP2023/081216, filed on Nov. 8, 2023.

(30) Foreign Application Priority Data

Nov. 8, 2022 (EP) .................... 22206174

(51) Int. Cl.
*G02C 7/02* (2006.01)
*G02C 7/06* (2006.01)

(52) U.S. Cl.
CPC .............. *G02C 7/028* (2013.01); *G02C 7/068* (2013.01); *G02C 2202/16* (2013.01)

(58) Field of Classification Search
CPC ..... G02C 7/028; G02C 7/068; G02C 2202/16
USPC .............. 351/41, 159.01, 159.73, 159.74
See application file for complete search history.

(56) References Cited

U.S. PATENT DOCUMENTS

| | | | |
|---|---|---|---|
| 8,790,104 B2 * | 7/2014 | Lai | G02B 3/0087 |
| | | | 425/808 |
| 2016/0101573 A1 | 4/2016 | Quere et al. | |
| 2019/0391411 A1 | 12/2019 | Kelch et al. | |
| 2020/0201071 A1 | 6/2020 | Kelch et al. | |

(Continued)

FOREIGN PATENT DOCUMENTS

| | | |
|---|---|---|
| CN | 110673357 A | 1/2020 |
| CN | 112526766 A | 3/2021 |

(Continued)

OTHER PUBLICATIONS

B. Brixner, "Lens design merit functions: rms image spot size and rms optical path difference," Applied Optics, vol. 17, No. 5, pp. 715 to 716, Mar. 1978.

(Continued)

*Primary Examiner* — Tuyen Tra
(74) *Attorney, Agent, or Firm* — Tautz & Schuhmacher LLC; Georg Hasselmann

(57) ABSTRACT

A computer-implemented method for calculating a digital twin of a spectacle lens is provided to use the digital twin for a manufacture of the spectacle lens. The digital twin has a predefined power distribution and contains a layer stack with a plurality of individual layers, each layer having a non-uniform layer thickness with a spatial variation and a uniform refractive index. The method includes determining the spatial variation of the layer thicknesses of the individual layers to achieve the predefined power distribution by a spatial control of optical path lengths.

16 Claims, 3 Drawing Sheets

(56) References Cited

U.S. PATENT DOCUMENTS

| | | |
|---|---|---|
| 2021/0141244 A1 | 5/2021 | Kelch et al. |
| 2021/0199991 A1 | 7/2021 | Kelch et al. |
| 2021/0362444 A1 | 11/2021 | Totzeck et al. |

FOREIGN PATENT DOCUMENTS

| | | | |
|---|---|---|---|
| CN | 112805616 A | | 5/2021 |
| CN | 113196144 A | | 7/2021 |
| WO | 2018152596 A1 | | 8/2018 |
| WO | 2020165439 A1 | | 8/2020 |

OTHER PUBLICATIONS

Zemax Manual, Optical Design Program, User's Guide: Chapter 14, Optimization, pp. 381 to 429, Nov. 2004.

Industrial Norm "Ophthalmic optics—Spectacle lenses—Vocabulary (ISO 13666:2019)," English version EN ISO ISO 13666:2019, Dec. 2019.

European Search Report issued in EP 22 206 174.9, to which this application claims priority, mailed Apr. 18, 2021.

International Search Report and Written Opinion issued in PCT/EP2023/081216, to which this application claims priority, mailed Feb. 22, 2024.

International Preliminary Report on Patentability issued in PCT/EP2023/081216, to which this application claims priority, mailed Feb. 6, 2025.

Office Action by the European Patent Office (EPO) issued in EP 23 798 998.3, which is a counterpart hereof, mailed on Jul. 7, 2025.

Office Action by the Chinese Patent Office (CNIPA) issued in CN 120112836A, which is a counterpart hereof, mailed on Aug. 1, 2025 and English-language translation thereof.

\* cited by examiner

COMPUTER-IMPLEMENTED METHOD FOR CALCULATING A DIGITAL TWIN OF A SPECTACLE LENS

CROSS REFERENCE TO RELATED APPLICATIONS

This application is a continuation application of international patent application PCT/EP2023/081216, filed on Nov. 8, 2023 and designating the U.S., which claims priority to European patent application EP 22 206 174.9, filed on Nov. 8, 2022, both of which are hereby incorporated by reference in their entireties.

TECHNICAL FIELD

The present disclosure relates to a computer-implemented method for calculating a digital twin of a spectacle lens having a predefined power distribution and containing a layer stack with a plurality of individual layers, each layer having a non-uniform layer thickness with a spatial variation and a uniform refractive index and to a spectacle lens having a predefined power distribution and containing a layer stack with a plurality of individual layers, each layer having a non-uniform layer thickness with a spatial variation and a uniform refractive index.

BACKGROUND

WO 2020/165439 A1 discloses a refractive optical component, in particular for the production of a spectacle lens. The refractive optical component comprises a main body having a refractive index profile, modulated along at least a principal axis, with a plurality of maxima and minima, wherein the thickness of the layers varies over the extent thereof transversely to the principal axis, and wherein a number of maxima in the refractive index profile within a given layer in directions transversely to the principal axis is less than 20. In a further aspect the layers have a constant refractive index in their interior. Variations arise exclusively in the regions of the interfaces between two layers adjoining one another. According to WO 2020/165439 A1, the concrete optical and/or geometric data of the main body to be manufactured can serve as construction data. Alternatively or additionally, it should be possible to ascertain the construction data from the prescription data for a spectacle lens to be manufactured.

SUMMARY

Based on WO 2020/165439 A1, in particular based on page 37, lines 24 to 27, disclosing to calculate from the prescription data for a spectacle lens the construction data of the main body, more particularly the refractive index profile of the main body and also control parameters for controlling the material application with the aid of the device for additive manufacturing of the main body, it has been the object of the present disclosure to provide a concrete algorithm for the calculation of a layer structure based on a predefined targeted power distribution of a spectacle lens.

This problem has been solved by a computer-implemented method for calculating a digital twin of a spectacle lens and by a spectacle lens having a predefined power distribution and containing a layer stack with a plurality of individual layers, each layer having a non-uniform layer thickness with a spatial variation and a uniform refractive index.

Exemplary embodiments, which might be realized in an isolated fashion or in any arbitrary combination, are described below.

The computer-implemented method being configured for calculating a digital twin of a spectacle lens for the purpose of a use of the digital twin for a manufacture of the spectacle lens, the digital twin of the spectacle lens having a predefined power distribution and comprising a plurality of individual layers each having a non-uniform layer thickness with a spatial variation and a uniform refractive index, the layer stack comprising individual layers having a different uniform refractive index, according to the disclosure is characterized in the step of:

determining the spatial variation of the layer thicknesses of the individual layers to achieve the predefined power distribution by a spatial control of optical path lengths.

Alternatively, the computer-implemented method being configured for calculating a layer stack of a digital twin of a spectacle lens for the purpose of a use of the calculation for a manufacture of the spectacle lens, the digital twin having a predefined power distribution, the layer stack having a plurality of individual layers each having a non-uniform layer thickness with a spatial variation and a uniform refractive index, the method being characterized in the step of:

determining the spatial variation of the layer thicknesses of the individual layers to achieve the predefined power distribution by a spatial control of optical path lengths.

Alternatively, the computer-implemented method being configured for calculating a layer stack of a digital twin of a spectacle lens for the purpose of a use of the calculation for a manufacture of the spectacle lens, the digital twin having a predefined power distribution, the layer stack having a plurality of individual layers each having a non-uniform layer thickness with a spatial variation and a uniform refractive index, the layer stack comprising individual layers having a different uniform refractive index, the method being characterized in the step of:

determining the spatial variation of the layer thicknesses of the individual layers to achieve the predefined power distribution by a spatial control of optical path lengths.

A "digital twin" of a spectacle lens is a mathematical description of a lens surface of a front surface of the spectacle lens, a mathematical description of a lens surface of a back surface of the spectacle lens, the mathematical description including a relative orientation of the lens surface of the front surface to the lens surface of the back surface and a refractive index distribution $n(x,y,z)$ for the spectacle lens. Accordingly, a digital twin of a gradient-index spectacle lens is a mathematical description of a lens surface of a front surface of the gradient-index spectacle lens, a mathematical description of a lens surface of a back surface of the gradient-index spectacle lens, the mathematical description including a relative orientation of the lens surface of the front surface to the lens surface of the back surface and a refractive index distribution $n(x,y,z)$ for the gradient-index spectacle lens. In the digital twin of the spectacle lens, the refractive index distribution $n(x,y,z)$ typically is uniform within an individual layer. In the digital twin of the gradient-index spectacle lens, the refractive index distribution $n(x,y,z)$ is non-uniform within the gradient-index spectacle lens. The refractive distribution $n(x,y,z)$ is either in a same coordinate system as the mathematical description or a transformation in a coordinate system of the mathematical descriptions is known. The digital twin of the spectacle lens and the digital twin of the gradient-index spectacle lens each is for the purpose of a use of manufacturing the spectacle lens. The digital twin of the gradient-index spectacle lens transferred to physical reality typically is not a gradient-index spectacle lens but a spectacle lens behaving with respect to optical path lengths of identically incident light beams through the spectacle lens as the digital twin of the gradient-index spectacle lens. Transferring the digital twin of the gradient-index spectacle lens to physical reality typically is the same as transferring a layer stack of the digital twin of the gradient-index spectacle lens to physical reality. In other words, optical path lengths of identically incident light beams through the spectacle lens equals in identical positions or identical discrete positions optical path lengths through the digital twin of the gradient-index spectacle lens. Typically, therefore, optical path lengths of identical vertically or identical nearly vertically incident light beams are compared. Vertically incident light beams typically are referring to incident light beams perpendicular to a plane through an optical centre or a geometrical centre of the spectacle lens and, for comparison, through an optical centre or a geometrical centre of the digital twin of the gradient-index spectacle lens, the plane being perpendicular to the optical axis or the z direction of the spectacle lens and the digital twin of the gradient-index spectacle lens, respectively.

The lens surface of the digital twin, of both the spectacle lens and the gradient-index spectacle lens, is as defined in ISO 13666:2019(E), section 3.4 or is defined analogously as in ISO 13666:2019(E), section 3.4. The lens surface of the digital twin, of both the spectacle lens and the gradient-index spectacle lens, may be shaped as one of the following:

- as a spherical surface as defined in ISO 13666:2019(E), section 3.4.1,
- as a cylindrical surface as defined in ISO 13666:2019(E), section 3.4.2,
- as an aspherical surface as defined in ISO 13666:2019(E), section 3.4.3,
- as a toroidal surface as defined in ISO 13666:2019(E), section 3.4.6,
- as an atoroidal surface as defined in ISO 13666:2019(E), section 3.4.7,
- as a power-variation surface defined analogously as in ISO 13666:2019(E), section 3.4.10,
- as a meridionally-compensated aspherical surface defined analogously as in ISO 13666:2019 (E), section 3.4.11.

In other words: the front surface of the digital twin, each of the spectacle lens and the gradient-index spectacle lens, may be shaped according to one of the before mentioned lens surfaces, the back surface of the digital twin, each of the spectacle lens and the gradient-index spectacle lens, may be shaped according to one of the before mentioned lens surfaces.

The front surface of the digital twin, of both the spectacle lens and the gradient-index spectacle lens, is defined analogously to ISO 13666:2019(E), section 3.2.13, as a surface which when the digital twin is transferred in the spectacle lens is intended to be fitted away from the eye. The back surface of the digital twin, of both the spectacle lens and the gradient-index spectacle lens, is defined analogously to ISO 13666:2019(E), section 3.2.14, as a surface which when the digital twin is transferred to the spectacle lens is intended to be fitted nearer to the eye. The digital twin is transferred in the spectacle lens, i.e., the digital twin is transferred to physical reality, for example by manufacturing the spectacle lens, typically by an additive manufacturing method, further typically by inkjet printing the spectacle lens. Examples for the additive manufacturing method are stereolithography (SLA) 3D printing or selective laser melting (SLM) 3D printing.

The refractive index distribution $n(x,y)$ for the spectacle lens averaged in z direction is a refractive index distribution the spectacle lens should have after having been manufactured, typically by an additive manufacturing method, further typically after having been inkjet printed. The refractive index distribution $n(x,y,z)$ typically specifies a refractive index in a) each x,y,z position or b) in each discrete x,y,z position of the digital twin, of both the spectacle lens and the gradient-index spectacle lens.

A digital twin of a spectacle lens is a mathematical description or a mathematical representation of lens surfaces of the spectacle lens including a refractive index distribution $n(x,y,z)$, the mathematical description or the mathematical representation being computer-readable data or in the form of computer-readable data. A digital twin of a gradient-index spectacle lens is a mathematical description or a mathematical representation of lens surfaces of the gradient-index spectacle lens including a refractive index distribution $n(x,y,z)$, the mathematical description or the mathematical representation being computer-readable data or in the form of computer-readable data. The computer-readable data may (i) be stored on a computer-readable storage medium, or (ii) transferred via a data signal. The computer-readable storage medium may be a non-transitory tangible computer-readable storage medium. The computer-readable data may additionally contain manufacturing instructions for transferring the digital twin, of both the spectacle lens and the gradient-index spectacle lens, to physical reality, i.e., for manufacturing the spectacle lens, typically manufacturing instructions considering an additive manufacturing method, further typically printing instructions to inkjet print the spectacle lens. The computer-readable data alternatively may contain printing instructions which, when the printing instructions are executed by an inkjet printer, cause the inkjet printer to inkjet print the spectacle lens.

A digital twin of a spectacle lens or a digital twin of a gradient-index spectacle lens may, additionally or alternatively, be one of the following:

- an analytical description or an analytical model describing or representing the spectacle lens or the gradient-index spectacle lens. The analytical description or the analytical model typically comprises or is (i) a mathematical formula describing a lens surface of a front surface of the digital twin of the spectacle lens or of the digital twin of the gradient-index spectacle lens, (ii) a mathematical formula describing a lens surface of a back surface of the digital twin of the spectacle lens or of the digital twin of the gradient-index spectacle lens and (iii) a mathematical formula describing a refractive index distribution $n(x,y,z)$, typically specifying a refractive index a) in each x,y position of a front surface or in each discrete x,y position of a front surface, b) in each x,y position of a back surface or in each discrete x,y position of a back surface and c) in each x,y,z position in between the front surface and the back surface or in each discrete x,y,z position in between the front surface and the back surface;
- an analytical description or an analytical model describing or representing the spectacle lens or the gradient-index spectacle lens, the analytical description or the analytical model additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

in the form of an analytical description or an analytical model representing the spectacle lens or the gradient-index spectacle lens;

in the form of an analytical description or an analytical model representing the spectacle lens or the gradient-index spectacle lens, the analytical description or the analytical model additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the analytical description or the analytical model being (i) computer-readable data or (ii) in the form of computer-readable data;

the analytical description or the analytical model being (i) computer-readable data or (ii) in the form of computer-readable data, the computer-readable data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the analytical description or the analytical model being (i) stored on a computer-readable storage medium or (ii) transferred via a data signal. The computer-readable storage medium may be a non-transitory tangible computer-readable storage medium;

numerical data describing or representing the spectacle lens or the gradient-index spectacle lens. The numerical data typically are comprising or being a conversion of the analytical description or the analytical model. The numerical data typically are comprising a pattern which comprises discrete x,y positions of or on a front surface of the digital twin of the spectacle lens or of the digital twin of the gradient-index spectacle lens and discrete x,y positions of or on a back surface of the digital twin of the spectacle lens or of the digital twin of the gradient-index spectacle lens. The pattern comprising discrete x,y positions may be adapted or selected arbitrarily. Typically, the pattern comprising discrete x,y positions is adapted or selected to consider a print resolution of a respective SLA or SLM 3D printing method. Further typically, the pattern comprising discrete x,y positions is adapted or selected to consider a print resolution of an inkjet printer, i.e., the discrete x,y positions typically are considering a print resolution of an inkjet printer, typically a print resolution of an inkjet print head of an inkjet printer. So, the numerical data comprises a function value of an analytical description or an analytical model of the lens surface in each of the discrete x,y positions. The x,y,z values of the front and back surface are described in the same coordinate system or a relative orientation of the coordinate systems of the front surface and the back surface is comprised in the numerical data. A refractive index distribution comprising a pattern which comprises a function value of an analytical description or an analytical model for each (i) discrete x,y positions of or on a front surface of the digital twin of the spectacle lens ($n(x,y)$), (ii) discrete x,y positions of or on a back surface of the digital twin of the spectacle lens ($n(x,y)$) and (iii) discrete x,y,z positions in between the front surface and the back surface ($n(x,y,z)$), is comprised in the numerical data. Typically, the numerical data are taken as a basis for calculating a layer stack of the digital twin of the spectacle lens or of the digital twin of the gradient-index spectacle lens. Compared to taking an analytical description or an analytical model, as defined before, as a basis for calculating the layer stack, less computing power is needed when the numerical data are taken as a basis for calculating. Phrased differently, calculating the layer stack with the numerical data is computationally less expensive;

numerical data describing or representing the spectacle lens or the gradient-index spectacle lens, the numerical data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

in the form of numerical data describing or representing the spectacle lens or the gradient-index spectacle lens;

in the form of numerical data describing or representing the spectacle lens or the gradient-index spectacle lens, the numerical data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the numerical data being (i) computer-readable data or (ii) in the form of computer-readable data;

the numerical data being (i) computer-readable data or (ii) in the form of computer-readable data, the computer-readable data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the numerical data being (i) stored on a computer-readable storage medium or (ii) transferred via a data signal. The computer-readable storage medium may be a non-transitory tangible computer-readable storage medium;

computer-readable data describing or representing the spectacle lens or the gradient-index spectacle lens;

computer-readable data describing or representing the spectacle lens or the gradient-index spectacle lens, the computer-readable data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

in the form of computer-readable data describing or representing the spectacle lens or the gradient-index spectacle lens;

in the form of computer-readable data describing or representing the spectacle lens or the gradient-index spectacle lens, the computer-readable data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the computer-readable data being (i) stored on a computer-readable storage medium or (ii) transferred via a data signal. The computer-readable storage medium may be a non-transitory tangible computer-readable storage medium;

a virtual representation of a spectacle lens or a gradient-index spectacle lens;

a virtual representation of a spectacle lens or a gradient-index spectacle lens in the form of computer-readable data;

a virtual representation of a spectacle lens or a gradient-index spectacle lens in the form of computer-readable data, the computer-readable data additionally containing manufacturing instructions, typically manufacturing instructions considering an additive manufacturing method typically to 3D print the spectacle lens, further typically printing instructions (i) to inkjet print the spectacle lens or (ii) when executed by an inkjet printer to cause the inkjet printer to inkjet print the spectacle lens;

the virtual representation of a spectacle lens or a gradient-index spectacle lens each being (i) stored on a computer-readable storage medium or (ii) transferred via a data signal. The computer-readable storage medium may be a non-transitory tangible computer-readable storage medium;

the virtual representation of a spectacle lens or a gradient-index spectacle lens each in the form of computer-readable data, the computer-readable data being (i) stored on a computer-readable storage medium or (ii) transferred via a data signal. The computer-readable storage medium may be a non-transitory tangible computer-readable storage medium.

An "x,y,z position," an "x,y position," a "discrete x,y,z position," a "discrete x,y position," each is defined in an x,y,z coordinate system which is defined as follows: A predefined point of the digital twin of the spectacle lens, or a predefined point of the spectacle lens, a predefined point of the digital twin of the gradient-index spectacle lens, or a predefined point of the gradient-index spectacle lens, each defines an origin of an x,y,z coordinate system and i) a surface normal or ii) a primary direction at the predefined point defines a "z direction." An "x,y direction" is in a plane perpendicular to the surface normal or the primary direction. In the plane perpendicular to the surface normal or the primary direction an x direction and a y direction are perpendicular to each other. The predefined point typically is a geometrical centre of the digital twin of the spectacle lens or the spectacle lens or a geometrical centre of the digital twin of the gradient-index spectacle lens or the gradient-index spectacle lens. The primary direction of the digital twin of the spectacle lens is defined analogously as in ISO 13666:2019(E), section 3.2.25, as direction of a virtually represented line of sight (3.2.24), usually taken to be a horizontal, to an object at an infinite distance when assumed looking straight ahead in unaided vision. The primary direction of the spectacle lens is defined as in ISO 13666:2019 (E), section 3.2.25, as direction of a line of sight (3.2.24), usually taken to be a horizontal, to an object at an infinite distance measured with habitual head and body posture when looking straight ahead in unaided vision. The geometrical centre of the digital twin of the spectacle lens is defined analogously as in ISO 13666:2019(E), section 3.2.6, as intersection of a horizontal centreline (3.2.3) and vertical centreline (3.2.4) of a rectangular box that virtually circumscribes a shape of the digital twin. The geometrical centre of the spectacle lens is as defined in ISO 13666:2019(E), section 3.2.6, an intersection of a horizontal centreline (3.2.3) and vertical centreline (3.2.4) of a rectangular box that circumscribes a shape of the uncut spectacle lens (3.8.8). The definitions given before with respect to the geometrical centre shall apply accordingly for the digital twin of the gradient-index spectacle lens and the gradient-index spectacle lens.

A "spectacle lens" or lens is as defined in ISO 13666:2019(E), section 3.5.2, an ophthalmic lens (3.5.1) worn in front of, but not in contact with, the eyeball.

A front surface is as defined in ISO 13666:2019(E), section 3.2.13, a surface of a lens (3.5.2) intended to be fitted away from the eye. A back surface is as defined in ISO 13666:2019(E), section 3.2.14, a surface of a lens (3.5.2) intended to be fitted nearer to the eye.

In the context of the present disclosure, a spectacle lens is further a physical representation of a corresponding digital twin of the spectacle lens. Or vice versa, the digital twin transferred to physical reality is a spectacle lens. Typically, the spectacle lens is a 3D printed, typically an inkjet printed physical representation of the corresponding digital twin.

A gradient-index spectacle lens is defined as a spectacle lens having in each x,y,z position or in each discrete x,y,z position a predefined refractive index that typically varies between different x,y,z positions or between different discrete x,y,z positions. In other words, the gradient-index spectacle lens is having a non-uniform refractive index. The variation of the refractive index between different x,y,z positions or between different discrete x,y,z positions typically is continuous.

A "layer stack" comprises a plurality of layers, each of the plurality of layers having a non-uniform layer thickness with a spatial variation and a uniform refractive index. The layer stack typically comprises additionally to the plurality of layers a base layer. The base layer typically has a uniform layer thickness and a uniform refractive index. The base layer is a layer which typically is to be applied to an optionally removable substrate, typically inkjet printed in or on an optionally removable substrate.

Typically the layer stack comprises up to 400 individual layers stacked, further typically up to 360 individual layers stacked. Further typically the layer stack comprises between 50 and 340 individual layers stacked, further typically between 60 and 320 individual layers stacked, more typically between 70 and 300 individual layers stacked and most typically between 80 and 280 individual layers stacked.

A "power distribution" comprises (i) a power distribution of a spectacle lens or (ii) a power distribution of a digital twin of a spectacle lens. A power of a spectacle lens as defined in ISO 13666:2019(E), section 3.1.10, is a capacity of a spectacle lens (3.5.2) or optical surface to change the curvature or direction of incident wavefronts by refraction. Analogously to the definition given in ISO 13666:2019(E), section 3.1.10, a power of a digital twin of a spectacle lens shall mean a capacity of the digital twin or an interface of a layer stack of the digital twin to cause a change of a curvature or direction of virtually incident wavefronts by refraction. An interface is separating in the layer stack of the digital twin two adjacent individual layers. A power distribution specifies a power of (i) a spectacle lens in any position or of a spectacle lens in any discrete position or (ii) a digital twin of a spectacle lens in any position or of a digital twin of a spectacle lens in any discrete position. The power distribution also comprises (i) a power distribution of a gradient-index spectacle lens or (ii) a power distribution of a digital twin of a gradient-index spectacle lens. A power of a gradient-index spectacle lens is defined analogously in ISO 13666:2019(E), section 3.1.10, is a capacity of a gradient-index spectacle lens to change the curvature or direction of incident wavefronts by refraction. Analogously to the definition given in ISO 13666:2019(E), section 3.1.10, a power of a digital twin of a gradient-index spectacle lens shall mean a capacity of the digital twin to cause a change of a curvature or direction of virtually incident wavefronts by refraction. A power distribution specifies a power of (i) a gradient-index spectacle lens in any position or of a gradient-index spectacle lens in any discrete position or (ii) a digital twin of a gradient-index spectacle lens in any position or of a digital twin of a gradient-index spectacle lens in any discrete position.

A "predefined power distribution" comprises (i) a predefined power distribution of a spectacle lens or (ii) a predefined power distribution of a digital twin of a spectacle lens. A predefined power distribution of a digital twin of a spectacle lens is a power distribution of the digital twin preset or specified typically in an analytical description or an analytical model describing or representing the spectacle lens. A predefined power distribution of a spectacle lens corresponds to the predefined power distribution of a digital twin of the spectacle lens. When manufacturing a spectacle lens considering the predefined power distribution of the digital twin, the predefined power distribution of the digital twin is physically present or physically realized in the spectacle lens. The spectacle lens is typically manufactured by an additive manufacturing method, further typically inkjet printed.

Typically, a) in each position of the 3D printed spectacle lens, typically the inkjet printed spectacle lens or b) in each discrete position of the 3D printed spectacle lens, typically the inkjet printed spectacle lens, a deviation between a predefined power distribution of the digital twin and a power distribution of a spectacle lens is less than or equal to $\frac{1}{1000}$ D. The predefined power distribution also comprises (i) a predefined power distribution of a gradient-index spectacle lens or (ii) a predefined power distribution of a digital twin of a gradient-index spectacle lens. A predefined power distribution of a digital twin of a gradient-index spectacle lens is a power distribution of the digital twin preset or specified typically in an analytical description or an analytical model describing or representing the gradient-index spectacle lens. A predefined power distribution of a gradient-index spectacle lens corresponds to the predefined power distribution of a digital twin of the gradient-index spectacle lens. When manufacturing a spectacle lens considering the predefined power distribution of the digital twin of the gradient-index spectacle lens, the predefined power distribution of the digital twin is physically present or physically realized in the spectacle lens. The spectacle lens is typically manufactured by an additive manufacturing method, further typically inkjet printed.

Typically, a) in each position of the 3D printed spectacle lens, typically the inkjet printed spectacle lens or b) in each discrete position of the 3D printed spectacle lens, typically the inkjet printed spectacle lens, a deviation between a predefined power distribution of the digital twin and a power distribution of a spectacle lens is less than or equal to $\frac{1}{1000}$ D.

A "non-uniform layer thickness with a spatial variation," typically of each layer of a layer stack of a (i) spectacle lens or (ii) digital twin of a spectacle lens, means that a layer thickness of a same individual layer is different in different positions or in different discrete positions. The non-uniform layer thickness with a spatial variation, typically of each layer of a layer stack of a (i) gradient-index spectacle lens or (ii) digital twin of a gradient-index spectacle lens, means that a layer thickness of a same individual layer is different in different positions or in different discrete positions. A non-uniform layer thickness with a spatial variation, typically of an individual layer of a layer stack projected in a plane held by an x direction and a y direction, in side view, in z direction, is a shortest distance between a point on an outermost surface of an individual layer of a layer stack to a point perpendicular to the point in z direction on a nearest interface of the individual layer, which is different to a shortest distance between another point on the outermost surface to a point perpendicular to the other point in z direction on the nearest interface of the individual layer, or on an interface of an individual layer of a layer stack to a point perpendicular to the point in z direction on a nearest interface of the individual layer which is different to a shortest distance between another point on the interface to a point perpendicular to the other point in z direction on the nearest interface of the individual layer.

A "uniform refractive index" of an individual layer is a constant refractive index or same refractive index of the individual layer. An individual layer having a uniform refractive index shall mean that the individual layer is having no refractive index distribution. In a spectacle lens or in a digital twin of a spectacle lens, each x,y,z position or each discrete x,y,z position of an individual layer of a layer stack has an identical refractive index. Typically, in a digital twin of a gradient-index spectacle lens, each x,y,z position or each discrete x,y,z position of an individual layer of a layer stack of the digital twin of the gradient-index spectacle lens has an identical refractive index. In the spectacle lens or in the digital twin, adjacent individual layers of the layer stack could have a) an identical refractive index which is uniform in each individual layer, or b) an individual layer could have a uniform refractive index which is different from a uniform refractive index of an adjacent individual layer or a different individual layer. In a spectacle lens, an individual layer corresponding to an individual layer having a uniform refractive index of a layer stack of a digital twin of a spectacle lens is typically manufactured with a same material, typically 3D printed with a same material, further typically inkjet printed with a same fluid. With respect to a digital twin of a spectacle lens, a uniform refractive index of an individual layer is a constant refractive index or same refractive index of the individual layer. For a calculation of a layer stack of the digital twin, a constant refractive index for each individual layer is taken as a basis, i.e., exact one value for a refractive index is taken as a basis for each individual layer. In a spectacle lens, an individual layer corresponding to an individual layer having a uniform refractive index of a layer stack of a digital twin of a gradient-index spectacle lens is typically manufactured with a same material, typically 3D printed with a same material, further typically inkjet printed with a same fluid. With respect to a digital twin of a gradient-index spectacle lens, a uniform refractive index of an individual layer typically is a constant refractive index or same refractive index of the individual layer. For a calculation of a layer stack of the digital twin of the gradient-index spectacle lens, a constant refractive index for each individual layer is taken as a basis, i.e., exact one value for a refractive index is taken as a basis for each individual layer. With respect to a spectacle lens, in particular a 3D printed spectacle lens, typically an inkjet printed spectacle lens in layers, occurring refractive index gradients within a printed individual layer, are typically not considered for an individual layer being of uniform refractive index. With respect to a spectacle lens an individual layer typically is alleged to be of uniform refractive index when based on a same material.

A "spatial control of optical path lengths" enables a digital twin of a spectacle lens to be calculated in that an optical path length through a layer stack of the digital twin of the spectacle lens is equal to an optical path length through the digital twin in an identical position or in an identical discrete position. In particular, the spatial control of optical path lengths enables a digital twin of a gradient-index spectacle lens to be calculated in that an optical path length through a layer stack of the digital twin of the gradient-index spectacle lens, the layer stack comprising individual layers having a different uniform refractive index in mutually different individual layers, is equal to an optical path length through the digital twin of the gradient-index spectacle lens in an identical position or in an identical discrete position.

A spatial control of optical path lengths enables a layer stack of a digital twin of a spectacle lens to be calculated in that an optical path length through the layer stack of the digital twin is equal to an optical path length through the digital twin in an identical position or in an identical discrete position. A layer stack of the digital twin is calculated in that an optical path length through the layer stack is equal to an optical path length through the digital twin in an identical position or in an identical discrete position.

In particular, the spatial control of optical path lengths enables the layer stack of the digital twin of the gradient-index spectacle lens to be calculated in that the optical path length through the layer stack of the digital twin of the gradient-index spectacle lens, the layer stack comprising individual layers having a different uniform refractive index in mutually different individual layers, is equal to the optical path length through the digital twin of the gradient-index spectacle in an identical position or in an identical discrete position. The layer stack of the digital twin of the gradient-index spectacle lens is calculated in that the optical path length through the layer stack is equal to the optical path length through the digital twin of the gradient-index spectacle lens in an identical position or in an identical discrete position.

A spatial control is selected in that optical path lengths in z direction through a sum of individual layers, i.e., through a plurality of individual layers, each individual layer thereof having a non-uniform layer thickness with a spatial variation, are equal to optical path lengths through (i) a spectacle lens or (ii) a digital twin of a spectacle lens, each compared optical path length compared in a respective position or in a respective discrete position.

In particular, the spatial control is selected in that optical path lengths in z direction through the sum of individual layers, i.e., through the plurality of individual layers, each individual layer thereof having the non-uniform layer thickness with the spatial variation, the plurality of individual layers comprising mutually different individual layers of different refractive indices, are equal to optical path lengths through (i) the gradient-index spectacle lens or (ii) the digital twin of the gradient-index spectacle lens, each compared optical path length compared in a respective position or in a respective discrete position.

"Equal" typically includes that one of the following conditions for an optical path length apply:
- an optical path length through a layer stack of a spectacle lens and an optical path length through the spectacle lens is identical,
- an optical path length through a layer stack of a digital twin of a spectacle lens and an optical path length through the digital twin is identical,
- an optical path length through a layer stack of a gradient-index spectacle lens, the layer stack comprising individual layers having a different uniform refractive index in mutually different individual layers, and an optical path length through the gradient-index spectacle lens is identical,
- an optical path length through a layer stack of a digital twin of a gradient-index spectacle lens, the layer stack comprising individual layers having a different uniform refractive index in mutually different individual layers, and an optical path length through the digital twin of the gradient-index spectacle lens is identical,
- a deviation of an optical path length through a layer stack of a spectacle lens and an optical path length through the spectacle lens is below the wavelength of visible light,
- a deviation of an optical path length through a layer stack of a digital twin of a spectacle lens and an optical path length through the digital twin is below the wavelength of visible light,
- a deviation of an optical through a layer stack of a gradient-index spectacle lens, the layer stack comprising individual layers having a different uniform refractive index in mutually different individual layers, and an optical path length through the gradient-index spectacle lens is below the wavelength of visible light,
- a deviation of an optical through a layer stack of a digital twin of a gradient-index spectacle lens, the layer stack comprising individual layers having a different uniform refractive index in mutually different individual layers, and an optical path length through the digital twin of the gradient-index spectacle lens is below the wavelength of visible light,
- each compared optical path lengths are of identically incident light beams in a respective position or in a respective discrete position.

A deviation of the compared optical path lengths being below the wavelength of visible light (380 nm-780 nm) may be for example a deviation below 300 nm or below 200 nm or below 100 nm. Typically, the deviation is same or at least similar for compared optical path lengths in different respective positions or in different respective discrete positions. In case the deviation is not same or not at least similar, unwanted effects such as blur may occur in a spectacle lens or in a gradient-index spectacle lens.

Typically, for the spatial control of optical path lengths the optical path lengths of identically incident light beams are compared. Typically, optical path lengths of identical vertically or identical nearly vertically incident light beams are compared. "Vertically" incident light beams typically are referring to incident light beams perpendicular to a plane for example through an optical centre or a geometrical centre of i) a spectacle lens or ii) a digital twin of a spectacle lens, the plane being perpendicular to the optical axis or the z direction of the i) spectacle lens or ii) digital twin of a spectacle lens. The optical centre of a spectacle lens is as defined in ISO 13666:2019(E), section 3.2.15, an intersection of the optical axis (3.1.8) with the front surface (3.2.13) of a lens (3.5.2). The optical centre of a digital twin of a spectacle lens shall be defined analogously as in ISO 13666: 2019(E), section 3.2.15, as an intersection of the optical axis with the front surface of the digital twin of the spectacle lens. The optical axis of a spectacle lens is as defined in ISO 13666:2019(E), section 3.1.8, a straight line joining the centres of curvature of both surfaces of a lens (3.5.2). The optical axis of a digital twin of a spectacle lens shall be defined analogously as in ISO 13666:2019(E), section 3.1.8, as a straight line joining the centres of curvature of both surfaces of a digital twin of a spectacle lens. "Nearly" vertically incident light beams tolerate a range typically from 0° to 20°, further typically from 1° to 15°, more typically from 2° to 12° and most typically from 3° to 10°, each tolerated range with respect to vertically incident light beams perpendicular to a plane through an optical centre or the geometrical centre of i) a spectacle lens or ii) a digital twin of a spectacle lens, the plane being perpendicular to the optical axis or the z direction of the i) spectacle lens or ii) digital twin of a spectacle lens. Accordingly, vertically incident light beams typically are referring to incident light beams perpendicular to a plane for example through an optical centre or a geometrical centre of i) a gradient-index spectacle lens or ii) a digital twin of a gradient-index spectacle lens, the plane being perpendicular to the optical axis or the z direction of the i) gradient-index spectacle lens or ii) digital twin of a gradient-index spectacle lens. The definitions given before with respect to the optical centre, the geometrical centre, the optical axis shall apply to the digital twin of the gradient-index spectacle lens or the gradient-index spectacle lens by analogy.

The above-described problem is fully solved by a computer-implemented method described in the forgoing. For calculating a digital twin of a spectacle lens without changing optical paths lengths therethrough in identical positions or in identical discrete positions a predefined power distribution of the digital twin of a spectacle lens is considered without a need for considering conditions such as a refractive index profile characterized by a three-dimensional Fourier transform described in WO 2020/165439 A1, page 7, line 13 to page 10, line 18.

The computer-implemented method is further configured for generating manufacturing instructions for manufacturing a spectacle lens, typically for generating additive manufacturing instructions for manufacturing a spectacle lens, further typically for generating printing instructions for inkjet printing a spectacle lens. The computer-implemented method is further configured for generating manufacturing instructions for the purpose of manufacturing a spectacle lens, typically for generating additive manufacturing instructions for the purpose of manufacturing a spectacle lens, further typically for generating printing instructions for the purpose of inkjet printing a spectacle lens. The manufacturing instructions, typically additive manufacturing instructions, further typically printing instructions, each are based on a digital twin of a spectacle lens. The manufacturing instructions, typically additive manufacturing instructions, are for the purpose of manufacturing a spectacle lens in layers. The printing instructions are for the purpose of inkjet printing a spectacle lens in layers.

In an exemplary embodiment of the disclosure, in the computer-implemented method being configured for generating printing instructions for inkjet printing a spectacle lens, for generating the printing instructions a digital twin of the spectacle lens having a predefined power distribution is sliced in a layer stack with a plurality of individual layers each having a non-uniform layer thickness with a spatial variation and a uniform refractive index, the method is characterized in the step of
slicing the digital twin in that the spatial variation of the layer thicknesses of the individual layers achieves the predefined power distribution by a spatial control of optical path lengths.

"Generating" printing instructions comprises the following steps, typically in the given order:
a) Slicing a digital twin of a spectacle lens into a layer stack, typically slicing a digital twin of a spectacle lens into a layer stack and a base layer;
b) Converting each individual layer of the layer stack, typically converting each individual layer of the layer stack and the base layer, into a spatial volume element pattern. In the spatial volume element pattern each volume element is positioned in a discrete x,y,z position. In the spatial volume element pattern each volume element represents an ink droplet. In the spatial volume element pattern a volume element serves as a virtual placeholder for an ink droplet. In the spatial volume element pattern each volume element positioned in a discrete x,y,z position serves as a virtual placeholder for each ink droplet to be positioned in a corresponding discrete x,y,z position of a spectacle lens, when the spectacle lens is inkjet printed in layers. Each volume element is a computer-readable representation of a digital positioning of an ink droplet in a discrete x,y,z position in the spatial volume element pattern of the digital twin of the spectacle lens. Typically, for converting the digital twin into the spatial volume element pattern a print resolution of an inkjet printer, typically an inkjet print head of the inkjet printer is considered;
c) Transferring the spatial volume element pattern into printing instructions which, when the printing instructions are executed by an inkjet printer, cause the inkjet printer to inkjet print the spectacle lens in layers. Typically, transferring the spatial volume element pattern into printing instructions which, when the printing instructions are executed by an inkjet printer, cause an inkjet print head of the inkjet printer to release a jet forming an ink droplet in a corresponding discrete x,y,z position in layers. Typically, the printing instructions are computer-readable data comprising a stack of images, one image for each layer to be inkjet printed, for example tiff images, and a text file, for example in .xml format. The text file typically comprises instructions for an order in which the stack of images corresponding to the layer stack is to be inkjet printed. The text file typically further comprises process parameters that are required to inkjet print the spectacle lens in layers like a power of LEDs to cure ink droplets, the ink droplets typically comprising a UV-curable fluid, and an increase of the z-position of an inkjet print head after having inkjet printed a layer to avoid collision of the inkjet print head with the inkjet printed layer.

"Printing instructions" are computer-readable data which, when the printing instructions are executed by an inkjet printer, cause the inkjet printer to inkjet print a spectacle lens.

Printing instructions are computer-readable data based on a sliced digital twin of a spectacle lens.

Printing instructions are in the form of computer-readable data and are based on a sliced digital twin of a spectacle lens; when the printing instructions are executed by an inkjet printer, the printing instructions cause the inkjet printer to inkjet print a spectacle lens.

The printing instructions being computer-readable data or being in the form of computer-readable data typically are (i) stored on a computer-readable storage medium or (ii) transferred via a data signal. The computer-readable storage medium may be a non-transitory tangible computer-readable storage medium.

The printing instructions are configured to, when executed by an inkjet printer, to cause the inkjet printer to inkjet print a spectacle lens. The printing instructions are computer-readable data which, when executed by an inkjet printer, are configured to cause the inkjet printer to inkjet print a spectacle lens in layers, wherein in each individual layer, beginning from a base layer directly adjacent to an optionally removable substrate, ink droplets are positioned in discrete x,y,z positions. The discrete x,y,z positions of the ink droplets positioned in layers to inkjet print a spectacle lens correspond to discrete x,y,z positions of volume elements in a spatial volume element pattern of a digital twin of the spectacle lens to be inkjet printed.

The printing instructions are for the purpose of a use thereof for inkjet printing a spectacle lens. The printing instructions are suitable for the purpose of a use thereof for inkjet printing a spectacle lens. The printing instructions are computer-readable data (i) for the purpose or (ii) configured for the purpose of a use of the data for inkjet printing a spectacle lens in layers. Inkjet printing of the spectacle lens begins with inkjet printing a base layer directly in or on an optionally removable substrate and continues with inkjet printing layer-by-layer until the spectacle lens is finished inkjet printed. The positioning of each ink droplet in a discrete x,y,z position in each layer is specified by a corresponding discrete x,y,z position of a volume element in a spatial volume element pattern of a digital twin of the spectacle lens to be inkjet printed.

Typically the printing instructions, when the printing instructions are executed by an inkjet printer, cause a print head of the inkjet printer to release a jet forming an ink droplet in a corresponding discrete x,y,z position in layers.

The substrate the base layer is inkjet printed in or on, or the base layer is directly adjacent to, may be removable from the inkjet printed spectacle lens or may remain with the inkjet printed spectacle lens. Typically, the spectacle lens and the substrate are removable from each other.

Typically, the printing instructions are in a computer-readable data format comprising a stack of images, one image for each individual layer to be inkjet printed, for example tiff images, and a text file, for example in .xml format, as described before.

A discrete x,y,z position of a volume element in a spatial volume element pattern of a sliced digital twin of a spectacle lens is "corresponding" to a discrete x,y,z position of an ink droplet when while inkjet printing the spectacle lens in layers the ink droplet is positioned according to the discrete x,y,z position of the volume element in the spatial volume element pattern of the sliced digital twin of the spectacle lens. The ink droplet is positioned in that discrete position that is in the spatial volume element pattern intended for its discrete positioning. Analogously, a discrete x,y,z position of an ink droplet is "corresponding" to a discrete x,y,z position of a volume element in a spatial volume element pattern of a sliced digital twin of a spectacle lens when while inkjet printing the spectacle lens in layers the ink droplet is positioned in that discrete x,y,z position in which the volume element had served as virtual representation or as virtual placeholder in the spatial volume element pattern of the digital twin.

"Discrete" shall mean an integer multiple of a minimum nozzle distance of an inkjet print head or an arrangement of two or more inkjet print heads.

"Slicing" is a conversion of a digital twin of a spectacle lens into a layer stack. Slicing is a calculation of a layer stack of a digital twin of a spectacle lens, typically of the layer stack and additionally a base layer. Typically, slicing is a conversion of the digital twin digitally represented by numerical data, the numerical data as defined before, into a layer stack. Compared to taking an analytical description or an analytical model, as defined before, as a basis for slicing, less computing power is needed when the numerical data are taken as a basis for slicing. Phrased differently, slicing the numerical data is computationally less expensive. Slicing is a digital conversion of the digital twin into a layer stack to preset for each layer a layer thickness in each discrete x,y,z position. Slicing is a conversion of the digital twin into a layer stack, the layer stack comprising a plurality of individual layers, each individual layer, typically apart from a base layer, having a non-uniform layer thickness with a spatial variation and a uniform refractive index. The non-uniform layer thickness is preset digitally in a centre, in an edge and in between in each discrete x,y,z position of each individual layer. Typically, each individual layer of the layer stack has an identical spatial expansion, typically in plan view, when projected in a plane held by an x direction and a y direction.

The digital twin may be sliced in that a total number of individual layers in the layer stack is divisible by a minimum number of individual layers having a uniform refractive index which is different from each other. In case the layer stack should comprise a plurality of individual layers each having a first uniform refractive index and a plurality of individual layers each having a second uniform refractive index, the minimum number of individual layers having a uniform refractive index which is different from each other is two and the total number of individual layers in the layer stack may be divisible by two. The plurality of individual layers each having a first uniform refractive index and the plurality of individual layers each having a second uniform refractive index may be arranged in the layer stack alternatingly, i.e., an individual layer of a second uniform refractive index following an individual layer of a first uniform refractive index, or in any order.

In case the layer stack should comprise a plurality of individual layers each having a first uniform refractive index, a plurality of individual layers each having a second uniform refractive index and a plurality of individual layers each having a third uniform refractive index, the minimum number of individual layers having a uniform refractive index which is different from each other is three and the total number of individual layers in the layer stack may be divisible by three. The plurality of individual layers each having a first uniform refractive index, the plurality of individual layers each having a second uniform refractive index and the plurality of individual layers each having a third uniform refractive index may be arranged in the layer stack to comprise repeating stacks comprising an individual layer of a first uniform refractive index, an individual layer of a second uniform refractive index and an individual layer of a third uniform refractive index, or to comprise repeating stacks comprising an individual layer of a first uniform refractive index, an individual layer of a third uniform refractive index and an individual layer of a second uniform refractive index, or to comprise repeating stacks comprising an individual layer of a second uniform refractive index, an individual layer of a first uniform refractive index and an individual layer of a third uniform refractive index, or to comprise repeating stacks comprising an individual layer of a second uniform refractive index, an individual layer of a third uniform refractive index and an individual layer of a first uniform refractive index, or to comprise repeating stacks comprising an individual layer of a third uniform refractive index, an individual layer of a first uniform refractive index and an individual layer of a second uniform refractive index, or to comprise repeating stacks comprising an individual layer of a third uniform refractive index, an individual layer of a second uniform refractive index and an individual layer of a first uniform refractive index, or in any order.

In case the layer stack should comprise a plurality of individual layers each having a first uniform refractive index, a plurality of individual layers each having a second uniform refractive index, a plurality of individual layers each having a third uniform refractive index and a plurality of individual layers each having a fourth uniform refractive index, the total number of individual layers in the layer stack may be divisible by four. In case the layer stack should comprise a plurality of individual layers each having a uniform refractive index, wherein a minimum number of individual layers having a different refractive index is more than four, the total number of individual layers in the layer stack may be divisible by a respective minimum number of different refractive indices as described above. With respect to an arrangement of the plurality of individual layers in which a minimum number of different refractive indices is four or more the before described typically is applicable by analogy.

BRIEF DESCRIPTION OF THE DRAWINGS

The disclosure will now be described with reference to the drawings wherein.

DETAILED DESCRIPTION OF EXEMPLARY EMBODIMENTS

Figure 1:
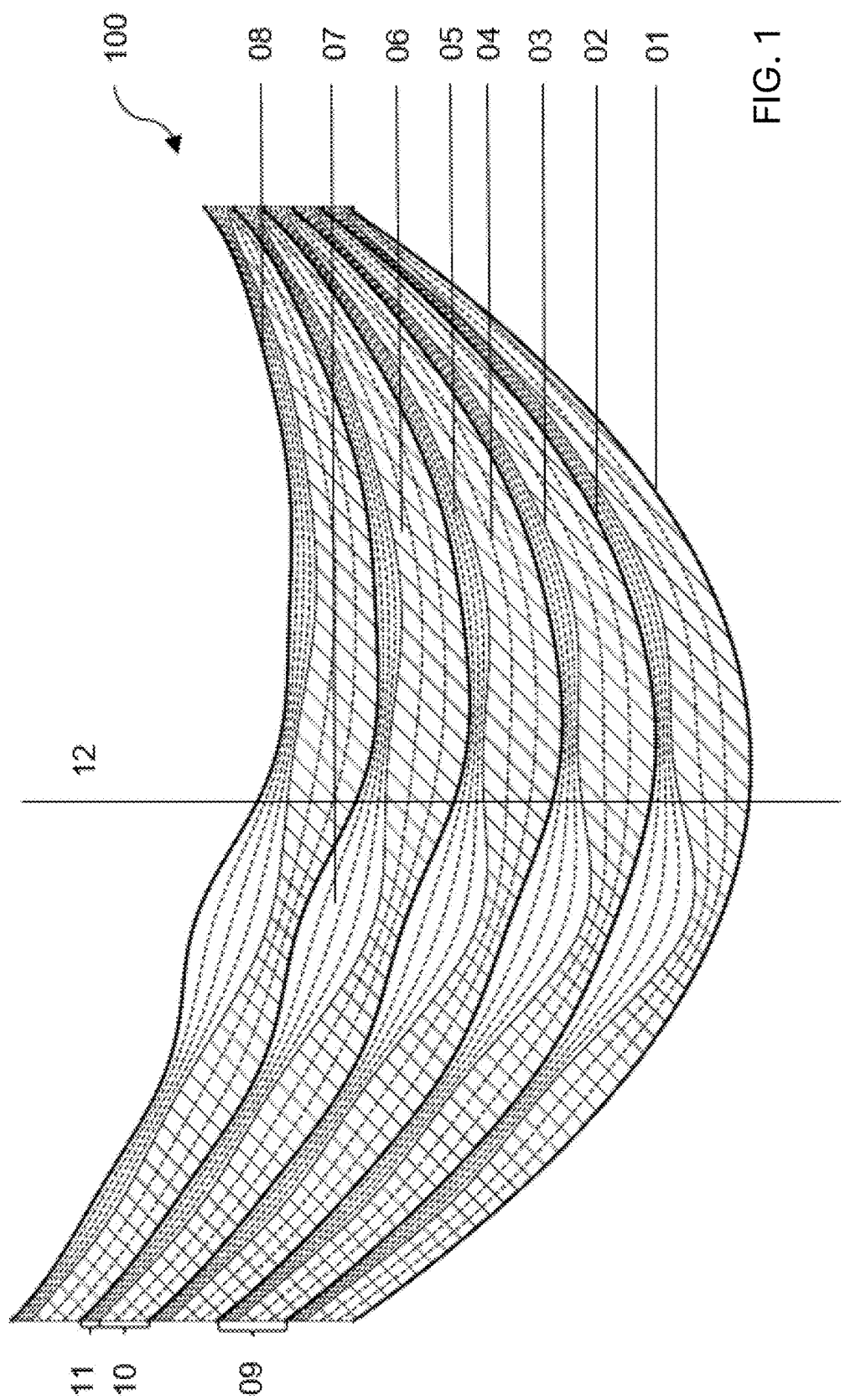
FIG. 1 shows a layer stack of a spectacle lens or a digital twin of a spectacle lens.

Typically, the digital twin (100 in FIG. 1) is sliced in that a form of every second interface (02 in FIG. 1) of the layer stack is determined by a linear combination of a lens surface of a front surface (01 in FIG. 1) of the digital twin and a lens surface of a back surface (08 in FIG. 1) of the digital twin. A form of every other interface (03 in FIG. 1) of the layer stack is a linear combination of a lens surface of a front surface of the digital twin and a lens surface of a back surface of the digital twin considering the uniform refractive indices of those two individual layers (10, 11 in FIG. 1) that have the other interface in common. The two individual layers having the other interface in common are each defined by the other interface and two different closest second interfaces. Considering the uniform different refractive indices of the two individual layers having the other interface in common means that an optical path length through an individual layer defined by closest second interfaces (09 in FIG. 1) equals in each discrete x,y,z position an optical path length through a respective gradient-index layer in a respective discrete x,y,z position. A gradient-index layer is one individual layer defined by closest second interfaces (09 in FIG. 1) having in each x,y,z position or in each discrete x,y,z position a predefined refractive index that typically varies between different x,y,z positions or between different discrete x,y,z positions. In other words, the gradient-index layer is having a non-uniform refractive index. The variation of the refractive index between different x,y,z positions or between different discrete x,y,z positions in the gradient-index layer typically is continuous. The gradient-index layer can be considered as gradient-index spectacle lens having a fraction of a same predefined power distribution of the gradient-index spectacle lens. A stack in z direction of gradient-index layers each having a fraction of a same predefined power distribution of the gradient-index spectacle lens results in the gradient-index spectacle lens having the predefined power distribution.

Typically, the digital twin is sliced to comprise three to seven, typically four to six, individual layers defined by two closest second interfaces. Typically, the three to seven individual layers defined by two closest second interfaces include an individual layer defined by the front surface of the digital twin and a closest second interface and an individual layer defined by the back surface of the digital twin and a closest second interface. In the respective gradient-index layer a gradient index is given between the uniform different refractive indices of the two individual layers having the other interface in common. Typically, the gradient index is determined between the uniform refractive indices of the two individual layers having the other interface in common, thereby not considering the uniform refractive indices themselves. Typically, the gradient index in the respective gradient index layer is limited by a minimum effective refractive index and a maximum effective refractive index, i.e., the gradient index is between the minimum effective refractive index and the maximum effective refractive index. The limitation typically enables that the two individual layers are continuous individual layers over their entire spatial expansion. The minimum effective refractive index for the respective gradient index layer typically is defined as:

$$n_{min} = n_0 + \frac{1}{1+\alpha}\Delta n$$

and the maximum effective refractive index for the respective gradient index layer typically is defined as:

$$n_{max} = n_0 + \frac{\alpha}{1+\alpha}\Delta n$$

with $n_0$ being the refractive index of one of the two individual layers (10 in FIG. 1), $n_0+\Delta n$ being the refractive index of the other one of the two individual layers (11 in FIG. 1) and $\alpha > 1$.

Further typically, the digital twin is sliced in that a form of a first interface to a base layer (not shown in FIG. 1) is determined by a linear combination of a lens surface of a front surface of the digital twin and a lens surface of a back surface of the digital twin. The first interface then is a first of the every second interfaces. Typically, the layer stack is sliced in that a form of a final interface opposite to the first interface is determined by a linear combination of a lens surface of a front surface of the digital twin and a lens surface of a back surface of the digital twin considering the uniform refractive indices of those two individual layers having the final interface in common. The final interface then is a last of the every other interfaces. A front surface of a spectacle lens is defined in ISO 13666:2019(E), section 3.2.13, a back surface of a spectacle lens is defined in ISO 13666:2019(E), section 3.2.14. A front surface of a digital twin of a spectacle lens shall be defined analogously to ISO 13666:2019(E), section 3.2.13, as a surface which when the digital twin is inkjet printed as a spectacle lens is intended to be fitted away from the eye. A back surface of a digital twin of a spectacle lens shall be defined analogously to ISO 13666:2019(E), section 3.2.14, as a surface which when the digital twin is inkjet printed as a spectacle lens is intended to be fitted nearer to the eye. A lens surface of a spectacle lens is defined in ISO 13666:2019(E), section 3.4. A lens surface of a digital twin of a spectacle lens shall be defined as in ISO 13666:2019(E), section 3.4 or analogously according to ISO 13666:2019(E), section 3.4. A form of an interface is a topography of the interface. The form of an interface is determined by, as described before, (i) a linear combination of a lens surface of a front surface of the digital twin and a back surface of the digital twin or (ii) a linear combination of a lens surface of a front surface of the digital twin and a lens surface of a back surface of the digital twin considering the uniform refractive indices of those individual layers being separated by the interface.

Optionally,
one individual layer defined by a second interface and a closest other interface, or
more individual layers each defined by a second interface and a closest other interface, or
each individual layer defined by a second interface and a closest other interface is or are sliced in that each inner form of an inner interface (04, 05 in FIG. 1) thereof is a linear combination of a form of an interface of the second interface and a form of an interface of the other interface. The inner interface is an interface within an individual layer defined by the second interface and the other interface. Typically, each individual layer defined by a second interface and a closest other interface is sliced in that each inner form of an inner interface thereof is a linear combination of a form of an interface of the second interface and a form of an interface of the other interface. Typically, each individual layer defined by a second interface and a closest other interface is sliced in that a total number of individual layers defined by a) closest inner interfaces and b) the second interface and a closest inner interface and c) the other interface and a closest inner interface results from a maximum layer thickness of the individual layer defined by the second interface and the closest other interface divided by a maximum layer thickness of an individual layer defined by a), b) or c), i.e., by a maximum layer thickness of an individual layer which is inkjet printable.

Additionally, typically,
an individual layer defined by a back surface of a digital twin and a closest other interface, and
an individual layer defined by a front surface of a digital twin and a closest other interface are sliced in that with respect to the back surface an inner form of an inner interface (04, 05 in FIG. 1) thereof is a linear combination of a lens surface of the back surface and a form of a respective closest other interface and with respect to the front surface an inner form of an inner interface (04, 05 in FIG. 1) thereof is a linear combination of a lens surface of the front surface and a form of a respective closest other interface. Typically, the individual layer defined by the back surface and the respective closest other interface is sliced in that a total number of individual layers defined by d) closest inner interfaces and e) the back surface and a closest inner interface and f) the other interface and a closest inner interface results from a maximum layer thickness of the individual layer defined by the back surface and the respective closest other interface divided by a maximum layer thickness of an individual layer defined by d), e) or f). Analogously, typically, the individual layer defined by the front surface and the respective closest other interface is sliced in that a total number of individual layers defined by g) the front surface and a closest inner interface and h) closest inner interfaces and i) the other interface and closest inner interfaces results from a maximum layer thickness of the individual layer defined by the front surface and the other interface divided by a maximum layer thickness of an individual layer defined by g), h) or i).

Particularly typical, a digital twin of a spectacle lens is sliced in that in a first step a form of each interface (02 in FIG. 1) is determined by a linear combination of a lens surface of a front surface (01 in FIG. 1) of the digital twin and a lens surface of a back surface (08 in FIG. 1) of the digital twin. In a second step, each individual layer of a resulting first layer stack, an individual layer being defined by a) two closest interfaces (individual layer=09 in FIG. 1), b) the front surface and a closest interface or c) the back surface and a closest interface, is sliced to comprise a first inner interface (03 in FIG. 1). A form of the first inner interface is determined by a linear combination of the lens surface of the front surface of the digital twin and the lens surface of the back surface of the digital twin considering a uniform refractive index of a first partial layer (e.g., 10 in FIG. 1) and a uniform refractive index of a second partial layer (e.g., 11 in FIG. 1), the first partial layer and the second partial layer having the first inner interface in common. Typically, each individual layer being defined by a) two closest interfaces, b) the front surface and a closest interface or c) the back surface and a closest interface is sliced to comprise the first inner interface dividing each individual layer in the first partial layer and the second partial layer such that an optical path length in each discrete x,y,z position of the individual layer defined by a), b) or c) equals an optical path length through a respective gradient-index layer. In the gradient-index layer a gradient index is between the uniform refractive index of the first partial layer and the uniform refractive index of the second partial layer. Typically, the gradient index is determined between the uniform refractive indices of the two partial layers having the first inner interface in common but without the respective uniform refractive indices themselves. Typically, the gradient index in the respective gradient-index layer is limited by a minimum effective refractive index and a maximum effective refractive index, i.e., the gradient index is between the minimum effective refractive index and the maximum effective refractive index, as explained before. Slicing each individual layer of the first layer stack to comprise each a first inner interface results in a second layer stack of the digital twin. In a third optional step, one individual layer defined by an interface and a closest first inner interface, or more individual layers each defined by an interface and a closest first inner interface, or each individual layer defined by an interface and a closest first inner interface is or are sliced to comprise one second inner interface or more second inner interfaces, thus resulting in a third layer stack of the digital twin. A form of a second inner interface is determined by a linear combination of a form of the interface and a form of the first inner interface.

Additionally, typically, an individual layer defined by the front surface of the digital twin and a closest first inner interface, and an individual layer defined by the back surface of the digital twin and a closest first inner interface are sliced to comprise one or more second inner interfaces. With respect to the front surface a form of the second inner interface is determined by a linear combination of a lens surface of the front surface and a form of a respective closest first inner interface. With respect to the back surface a form of the second inner interface is determined by a linear combination of a lens surface of the back surface and a form of a respective closest first inner interface.

Typically, each individual layer defined by a) an interface and a closest first inner interface, b) the front surface and a closest first inner interface, or c) the back surface and a closest first inner interface is sliced in that a total number of individual layers defined by d) closest second inner interfaces, e) an interface and a closest second inner interface, f) a first inner interface and a closest second inner interface, g) the front surface and a closest second inner interface or h) the back surface and a closest second inner interface results for each individual layer defined by a) from a maximum layer thickness of the individual layer defined by a) divided by a maximum layer thickness of an individual layer defined by d), e) and f). The individual layers defined by d), e) and f) each refer to the respective individual layers within each individual layer defined by a);

for an individual layer defined by b) from a maximum layer thickness of the individual layer defined by b) divided by a maximum layer thickness of an individual layer defined by d), g) and e). The individual layers defined by d), g) and e) each refer to the respective individual layers within an individual layer defined by b);

for an individual layer defined by c) from a maximum layer thickness of the individual layer defined by c) divided by a maximum layer thickness of an individual layer defined by h), d) and e). The individual layers defined by h) d) and e) each refer to the respective individual layers within an individual layer defined by c).

Typically, a total number of individual layers in the third layer stack depends on a maximum layer thickness with which an individual layer is inkjet printable.

Before the second layer stack is sliced, as described before, in the third optional step, one individual layer defined by an interface and a closest first inner interface, or more individual layers each defined by an interface and a closest first inner interface, or each individual layer defined by an interface and a closest first inner interface each of the second layer stack, alternatively to the before described third optical step, may be sliced to comprise only one second inner interface. Typically, in this case, a form of a second inner interface is determined by a linear combination of a form of an interface and a form of a closest first inner interface, the interface and the closest first inner interface defining the respective individual layer, thereby considering a refractive index of first partial layer and a refractive index of a second partial layer, the first partial layer and the second partial layer having the second inner interface in common. Considering the refractive indices of the first partial layer and the second partial layer having the second inner interface in common typically is in that an optical path length through an individual layer defined an interface and a closest first inner interface equals in each discrete x,y,z position an optical path length through a respective gradient-index layer. In the respective gradient-index layer a gradient index is determined between the refractive index of the first partial layer and the refractive index of the second partial layer, thereby not considering the refractive indices themselves. Typically, in the gradient-index layer the gradient index is determined between a minimum effective refractive index and a maximum effective refractive index.

Additionally, optionally, an individual layer defined by a front surface of a digital twin and a closest first inner interface and an individual layer defined by a back surface of a digital twin and a closest first inner interface each are sliced in analogy to the before described to comprise only one second inner interface.

Typically, only one individual layer defined by an interface and a closest first inner interface or defined by the front surface and a closest first inner interface or defined by the back surface and a closest first inner interface is sliced to comprise only one second inner interface as described before. The only one individual layer and the other individual layers of the second layer stack each are sliced as described in optional step three before, typically to be transferred in inkjet printable individual layers.

Optionally, more individual layers defined by an interface and a closest first inner interface, or one individual layer defined by an interface and a closest first inner interface, and the individual layer defined by the front surface and a closest first inner interface, or one individual layer defined by an interface and a closest first inner interface, and the individual layer defined by the back surface and a closest first inner interface, or one individual layer defined by an interface and a closest first inner interface, and the individual layer defined by the front surface and a closest first inner interface, and the individual layer defined by the back surface and a closest first inner interface, each are sliced to comprises exact one second inner interface, as described before.

The before mentioned individual layers and the other individual layers of the second layer stack each are sliced as described in optional step three before.

For generating printing instructions, step b) mentioned before, a conversion of each individual layer of a layer stack into a spatial volume element pattern typically is done after slicing, i.e., when step a) mentioned before, is completed.

Typically, for slicing a digital twin of a spectacle lens in a layer stack a maximum layer thickness of each individual layer of the layer stack is preset. The maximum layer thickness is typically determined by a maximum inkjet printable layer thickness with one ink droplet or more ink droplets, thereby considering the print resolution of an inkjet printer. For example, an ink droplet volume of 30 pL after cure together with an ink droplet distance of 25 µm result in a layer thickness of 48 µm. Further typically, a positioning of adjacent ink droplets in minimum distance to the single ink droplet in a same individual layer is considered for the determination of the maximum layer thickness. The positioning of adjacent ink droplets in minimum distance typically prevents the single ink droplet from a complete spreading. Typically the minimum distance is preset by a print resolution of an inkjet printer, typically by a print resolution of an inkjet print head of the ink jet printer. Typically, for slicing a minimum layer thickness of each individual layer of the layer stack is preset, the minimum layer thickness typically being determined by a minimum layer thickness still leading to a continuous individual layer. Further typically, a maximum distance of two single ink droplets inkjet printed in a same layer is considered for the determination of the minimum layer thickness. The maximum distance of the two single ink droplets is a maximum distance that allows for a coalescence of the two single ink droplets. Due to the coalescence a continuous individual layer is inkjet printable.

Typically, slicing ensures a knowledge of a layer thickness in each discrete x,y,z position of each individual layer of the layer stack. Phrased differently, slicing determines a spatial variation of a layer thickness of each individual layer having a non-uniform layer thickness. A positioning of ink droplets in a minimum distance, typically according to a print resolution of an inkjet printer, further typically according to a print resolution of an inkjet print head of an inkjet printer, or a positioning of ink droplets in a maximum distance are tools to support slicing the digital twin of the spectacle lens in a layer stack. Typically the spectacle lens is inkjet printed with the inkjet printer. Additionally or alternatively, knowledge of a thickness of the digital twin, i.e., a centre thickness, an edge thickness and a thickness in each discrete x,y position in between, support slicing the digital twin of the spectacle lens in a layer stack. The centre thickness of the digital twin shall mean, analogously to the definition given in ISO 13666:2019(E), section 3.2.47, a thickness of the digital twin of the spectacle lens at its reference point, determined normal to a front surface of the digital twin. The reference point of the digital twin shall, analogously to the definition given in ISO 13666:2019(E), section 3.2.19, correspond to a point on the front surface of the finished inkjet printed spectacle lens at which the verification power of a specific portion applies. The edge thickness shall mean, analogously to the definition given in ISO 13666:2019(E), section 3.2.48, a thickness at a point on an edge of the digital twin of the spectacle lens. The layer thickness in each corresponding x,y,z position of an inkjet printed individual layer depends on a density of ink droplets in the individual layer: the more ink droplets are positioned within an area element, the higher a layer thickness in the area element. The area element typically is preset to comprise within an individual layer more than ten discrete positions for ink droplets, i.e., more than ten positions in which an ink droplet (i) is positioned or (ii) could be positioned but is not positioned. The area element may comprise, typically when projected in a plane held by an x direction and a y direction, for example, an area of 100 discrete positions for ink droplets, ten in x direction and ten in y direction. Phrased differently, in an inkjet printed individual layer, a layer thickness in the area element is defined as number of ink droplets multiplied by a volume of an ink droplet divided by the area element:

$$\text{layer thickness} = \frac{\text{number of ink droplets} \times \text{volume of ink droplet}}{\text{area element}}$$

Typically, the digital twin is sliced to comprise, according to the before mentioned restrictions with respect to a minimum layer thickness and a maximum layer thickness, a minimum number of individual layers in the layer stack. The minimum number may depend on a minimum number of individual layers having a different refractive index from each other. In case the digital twin should be sliced to comprise a layer stack comprising
  (i) one or more stack(s) of alternating individual layers of a different refractive index, one of the alternating individual layers having a first uniform refractive index and one of the alternating individual layers having a second uniform refractive index, or
  (ii) one or more stack(s) of not alternating individual layers of a different refractive index, one thereof having a first uniform refractive index and one thereof having a second uniform refractive index,
  the minimum number of individual layers in the layer stack may be an integer multiple of two.

In case the digital twin should be sliced to comprise a layer stack comprising
  (i) one or more stack(s) of three individual layers of a different refractive index, the three individual layers repeating each other in a same order, a first individual layer thereof having a first uniform refractive index, a second individual layer thereof having a second uniform refractive index and a third individual layer thereof having a third uniform refractive index, or
  (ii) one or more stack(s) of three individual layers of a different refractive index, the three individual layers not repeating each other in any order, one individual layer thereof having a first uniform refractive index, one individual layer thereof having a second uniform refractive index and one individual layer thereof having a third uniform refractive index,
  the minimum number of individual layers in the layer stack may be an integer multiple of three.

In case the digital twin should be sliced to comprise a layer stack comprising
  (i) one or more stack(s) of four individual layers of a different refractive index, the four individual layers repeating each other in a same order, a first individual layer thereof having a first uniform refractive index, a second individual layer thereof having a second uniform refractive index, a third individual layer thereof having a third uniform refractive index and a fourth individual layer thereof having a fourth uniform refractive index, or
  (ii) one or more stack(s) of four individual layers of a different refractive index, the four individual layers not repeating each other in a same order, one individual layer thereof having a first uniform refractive index, one individual layer thereof having a second uniform refractive index, one individual layer thereof having a third uniform refractive index and one individual layer thereof having a fourth uniform refractive index,
  the minimum number of individual layers in the layer stack may be an integer multiple of four.

In case the digital twin should be sliced to comprise a layer stack comprising one or more stack(s) of more than four individual layers of a different refractive index the previously described typically applies analogously.

"An inkjet print head" shall mean a single inkjet print head or an arrangement of two or more inkjet print heads.

A "spatial volume element pattern" is a digital representation in volume elements or a virtual description in volume elements of each layer of a sliced digital twin of a spectacle lens. Each layer typically comprises each individual layer of a layer stack and a base layer. The digital representation or the virtual description are computer-readable data or are in the form of computer-readable data. The computer-readable data may (i) be stored on a computer-readable storage medium, or (ii) transferred via a data signal. The computer-readable storage medium may be a non-transitory tangible computer-readable storage medium. In a spatial volume element pattern each volume element is spatially positioned in a discrete x,y,z position. In the spatial volume element pattern each volume element in a discrete x,y,z position represents an ink droplet to be positioned in a corresponding discrete x,y,z position when inkjet printing the spectacle lens, typically when inkjet printing the spectacle lens in layers.

The above-described problem is fully solved by a computer-implemented method described in the forgoing. For slicing a digital twin of a spectacle lens without changing optical paths lengths therethrough in identical positions a predefined power distribution of the digital twin is considered without a need for considering conditions such as a refractive index profile characterized by a three-dimensional Fourier transform described in WO 2020/165439 A1, page 7, line 13 to page 10, line 18.

In an exemplary embodiment of the disclosure, the computer-implemented method is characterized by a layer stack comprising
a first plurality of individual layers each having a non-uniform layer thickness with a spatial variation and a first uniform refractive index,
a second plurality of individual layers each having a non-uniform layer thickness with a spatial variation and a second uniform refractive index, the second uniform refractive index being different to the first uniform refractive index.

The computer-implemented method being configured for calculating a digital twin of a spectacle lens for the purpose of a use of the digital twin for a manufacture of the spectacle lens comprises the step of
setting or arranging in a layer stack of the digital twin a first plurality of individual layers each having a non-uniform layer thickness with a spatial variation and a first uniform refractive index, and a second plurality of individual layers each having a non-uniform layer thickness with a spatial variation and a second uniform refractive index, the second uniform refractive index being different to the first uniform refractive index.

The setting or the arranging of the first plurality of individual layers and the second plurality of individual layers in the layer stack is such that in each position or in each discrete x,y,z position an optical path length through the layer stack equals a respective optical path length in a respective position or in a respective discrete x,y,z position through a spectacle lens or through a digital twin of the spectacle lens. The setting or the arranging of the first plurality of individual layers and the second plurality of individual layers in the layer stack is such that in each position or in each discrete x,y,z position an optical path length through the layer stack equals in a respective position or in a respective discrete x,y,z position an optical path length through a gradient-index spectacle lens or through a digital twin of the gradient-index spectacle lens. In the gradient-index spectacle lens or in the digital twin of the gradient-index spectacle lens a refractive index gradient is between
a first refractive index identical to the first uniform refractive index of each of the first plurality of individual layers and
a second refractive index identical to the second uniform refractive index of each of the second plurality of individual layers.

Typically, the refractive index gradient is between the first refractive index and the second refractive index but without the first refractive index and without the second refractive index themselves, as explained before.

The digital twin of the gradient-index spectacle lens in turn is typically taken as a basis for slicing, typically numerical data describing or representing the gradient-index spectacle lens are used for slicing the digital twin.

Arranging the first plurality of individual layers and the second plurality of individual layers in the layer stack such as to achieve equivalent optical path lengths in each respective position or in each respective discrete x,y,z position in the layer stack and a) in the gradient-index spectacle lens or b) in the digital twin of the gradient-index spectacle lens allows for a manufacture of the spectacles lens in layers. A refractive index distribution $n(x,y,z)$ of the digital twin of the gradient-index spectacle lens is transferred to physical reality by manufacturing the gradient-index spectacle lens according to the arrangement of the first plurality of individual layers and the second plurality of individual layers, as described before. Typically, the digital twin is transferred to physical reality by manufacturing the gradient-index spectacle lens by an additive manufacturing method. Further typically, the digital twin is transferred to physical reality by inkjet printing the gradient-index spectacle lens in layers according to the preset arrangement of individual layers of a different uniform refractive index. A decisive advantage of the arrangement of the first plurality of individual layers and the second plurality of individual layers is that a refractive index distribution $n(x,y,z)$ of a digital twin of a gradient-index spectacle lens is manufacturable without a need of applying in each position or in each discrete x,y,z position a material according the refractive index distribution $n(x,y,z)$. A decisive advantage of the arrangement is in particular that a refractive index distribution $n(x,y,z)$ of a digital twin of a gradient-index spectacle lens is inkjet printable without a need to inkjet print in each discrete x,y,z position according to the refractive index distribution $n(x,y,z)$.

Optionally or additionally, a modulation transfer function of the layer stack is essentially same to a modulation transfer function of a respective digital twin of a gradient-index spectacle lens. A modulation transfer function of the layer stack is essentially same to a modulation transfer function of the respective digital twin of a gradient-index spectacle lens when a) both modulation transfer functions are identical or b) a deviation between both modulation transfer functions typically is less than 7%, typically in a range from 0.5% to 5%, more typically in a range from 1% to 4% and most typically in a range from 1.2% to 3%.

Typically, the first plurality of individual layers and the second plurality of individual layers are arranged in the layer stack such that a modulation transfer function of the layer stack is essentially same to a modulation transfer function of a respective digital twin of a gradient-index spectacle lens. Typically, the first plurality of individual layers and the second plurality of individual layers are arranged in the layer stack such that a modulation transfer function is as a modulation transfer function of a respective digital twin of a gradient-index spectacle lens diffraction-limited only. Phrased differently, the first plurality of individual layers and the second plurality of individual layers are arranged in the layer stack to reproduce a diffraction-limited modulation transfer function of a respective digital twin of a gradient-index spectacle lens.

Arranging the first plurality of individual layers and the second plurality of individual layers in the layer stack such that a modulation transfer function of the layer stack is essentially same to a modulation transfer function of a respective digital twin of a gradient-index spectacle lens typically solves challenges going along with inkjet printing a gradient-index spectacle lens.

Typically, a difference between the first uniform refractive index and the second uniform refractive index is selected from at least one of the following:
  a refractive index difference of at least 0.05;
  a refractive index difference of at least 0.1;
  a refractive index difference of at least 0.15;
  a refractive index difference of at least 0.2;
  a refractive index difference of at least 0.21.

WO 2020/165439 A1 discloses on page 2, line 30 to page 3, line 6, a maximum refractive index difference in a direction parallel to the principal axis of at most 0.2, at most 0.1, at most 0.05, with further intervals until a maximum refractive index difference of at most 0.0001. WO 2020/165439 A1 further discloses on page 2, line 30 to page 3, line 6 to strive a minimum refractive index difference. In contrast hereto the present disclosure does not intend to minimize a difference in refractive index at an interface between a first individual layer having a first uniform refractive index and a second individual layer having a second refractive index but to ensure suitable adhesion at an interface between two individual layers of different refractive indices using available materials for a manufacture of the individual layers, in particular available fluids for inkjet printing the individual layers.

In the present disclosure, typically a refractive index distribution $n(x,y,z)$ of a digital twin of a gradient-index spectacle lens is preset. The digital twin is sliced in that an optical path length through a layer stack thereof is in each position or in each discrete position equal to an optical path length in a respective position or in a respective discrete position of the digital twin, as described before. In the digital twin a first plurality of individual layers, each individual layer thereof having a non-uniform layer thickness with a spatial variation and a first uniform refractive index, and a second plurality of individual layers, each individual layer thereof having a non-uniform layer thickness with a spatial variation and a second uniform refractive index, are arranged in that an effective refractive index in each position or in each discrete x,y,z position meets the preset refractive index distribution $n(x,y,z)$ of the digital twin. The effective refractive index depends on the first uniform refractive index, the second uniform refractive index and a ratio of the non-uniform layer thicknesses as exemplified in the following with respect to a two layer stack. An optical path length of a vertically incident light beam through a two layer stack consisting of a) a first individual layer having a non-uniform layer thickness $d_1$ with a spatial variation and a first uniform refractive index $n_1$ and b) a second individual layer having a non-uniform layer thickness $d_2$ with a spatial variation and a second uniform refractive index $n_2$, the vertically incident light beam entering the two layer stack in a point on a surface of the first individual layer and leaving the two layer stack on a perpendicular point on a surface of the second individual layer is defined as:

optical path length=$d_1 n_1 + d_2 n_2 = (d_1 + d_2) n_{eff}$, wherein $n_{eff}$=effective refractive index.

With $d_1 = a_1 d_{min}$, $a_1 \geq 1$, $d_{min}$=minimal layer thickness; $d_2 = a_2 d_{min}$, $a_2 \geq 1$; $n_1 = n_0$, $n_0$=minimum refractive index; $n_2 = n_0 + Dn$, $Dn$=refractive index difference, an effective refractive index is determined as:

$$n_{eff} = \frac{d_1 n_1 + d_2 n_2}{d_1 + d_2} = \frac{\alpha_1 n_0 + \alpha_2 (n_0 + \Delta n)}{\alpha_1 + \alpha_2} = n_0 + \frac{\alpha_2}{\alpha_1 + \alpha_2} \Delta n$$

showing that the effective refractive index depends on the first uniform refractive index, the second uniform refractive index and a ratio of the non-uniform layer thicknesses.

With a maximum layer thickness defined as $ad_{min}$, a minimum effective refractive index is determined as:

$$n_{min} = n_0 + \frac{1}{1+\alpha} \Delta n$$

and a maximum effective refractive index is determined as:

$$n_{max} = n_0 + \frac{\alpha}{1+\alpha} \Delta n$$

showing that an effective refractive index range is smaller than a range comprising the first uniform refractive index and the second uniform refractive index.

In an exemplary embodiment of the disclosure, the computer-implemented method is characterized by a layer stack comprising
  a first plurality of individual layers each having a non-uniform layer thickness with a spatial variation and a first uniform refractive index,
  a second plurality of individual layers each having a non-uniform layer thickness with a spatial variation and a second uniform refractive index, the second uniform refractive index being different to the first uniform refractive index,
  a third plurality of individual layers each having a non-uniform layer thickness with a spatial variation and a third uniform refractive index, the third uniform refractive index being different to the first uniform refractive index and being different to the second uniform refractive index.

The computer-implemented method being configured for calculating a digital twin of a spectacle lens for the purpose of a use of the digital twin for a manufacture of the spectacle lens, comprises the step of
  setting or arranging in a layer stack of the digital twin a first plurality of individual layers each having a non-uniform layer thickness with a spatial variation and a first uniform refractive index, a second plurality of individual layers each having a non-uniform layer thickness with a spatial variation and a second uniform refractive index, the second uniform refractive index being different to the first uniform refractive index, and a third plurality of individual layers each having a non-uniform layer thickness with a spatial variation and a third uniform refractive index, the third uniform refractive index being different to the first uniform refractive index and being different to the second uniform refractive index.

The setting or the arranging of the first plurality of individual layers, the second plurality of individual layers and the third plurality of individual layers is such that in the layer stack in each position or in each discrete x,y,z position an optical path length through the layer stack equals a respective optical path length in a respective position or a respective discrete x,y,z position through a spectacle lens or through a digital twin of the spectacle lens. The setting or the arrangement of the first plurality of individual layers, the second plurality of individual layers and the third plurality of individual layers in the layer stack is such that in each position or in each discrete x,y,z position an optical path length through the layer stack equals in a respective position or a respective discrete x,y,z position an optical path length through a gradient-index spectacle lens or through a digital twin of the gradient-index spectacle lens. In the gradient-index spectacle lens or in the digital twin of the gradient-index spectacle lens a refractive index gradient is between

- a first refractive index identical to the first uniform refractive index of each of the first plurality of individual layers,
- a second refractive index identical to the second uniform refractive index of each of the second plurality of individual layers, and
- a third refractive index identical to the third uniform refractive index of each of the third plurality of individual layers.

Typically, the refractive index gradient is between the first refractive index, the second refractive index and the third refractive index but without the first refractive index, without the second refractive index and without the third refractive index themselves, as explained before with respect to two different refractive indices.

The digital twin of the gradient-index spectacle lens in turn is typically taken as a basis for slicing, typically numerical data describing or representing the gradient-index spectacle lens are used for slicing the digital twin.

Arranging the first plurality of individual layers, the second plurality of individual layers and the third plurality of individual layers in the layer stack such as to achieve equivalent optical path lengths in each respective position or in each respective discrete x,y,z position in the layer stack and a) in the respective gradient-index spectacle lens or b) in the respective digital twin of the gradient-index spectacle lens allows for a manufacture of the gradient-index spectacles lens in layers. A refractive index distribution n(x,y,z) of a digital twin of a gradient-index spectacle lens is transferred to physical reality by manufacturing the gradient-index spectacle lens according to the arrangement of the first plurality of individual layers, the second plurality of individual layers and the third plurality of individual layers, as described before. Typically, the digital twin is transferred to physical reality by manufacturing the gradient-index spectacle lens by an additive manufacturing method. Further typically, the digital twin is transferred to physical reality by inkjet printing the gradient-index spectacle lens in layers according to the preset arrangement of individual layers of a different refractive index. A decisive advantage of the arrangement of the first plurality of individual layers, the second plurality of individual layers and the third plurality of individual layers is that a refractive index distribution n(x,y,z) of a digital twin of a gradient-index spectacle lens is manufacturable without a need of applying in each position or in each discrete x,y,z position a material according the refractive index distribution n(x,y,z). A decisive advantage of the arrangement is in particular that a refractive index distribution n(x,y,z) of a digital twin of a gradient-index spectacle lens is inkjet printable without a need to inkjet print in each discrete x,y,z position according to the refractive index distribution n(x,y,z).

Optionally or additionally, the first plurality of individual layers, the second plurality of individual layers and the third plurality of individual layers are arranged in the layer stack such that a modulation transfer function of the layer stack is essentially same to a modulation transfer function of a respective digital twin of a gradient-index spectacle lens. A modulation transfer function of the layer stack is essentially same to a modulation transfer function of a respective digital twin of a gradient-index spectacle lens when (i) both modulation transfer functions are identical, or (ii) a deviation between both is typically less than 7%, typically in a range from 0.5% to 5%, more typically in a range from 1% to 4% and most typically in a range from 1.2% to 3%.

Typically, the first plurality of individual layers, the second plurality of individual layers and the third plurality of individual layers are arranged in the layer stack such that a modulation transfer function is as a modulation transfer function of a respective digital twin of a gradient-index spectacle lens diffraction-limited only. Typically, the first plurality of individual layers, the second plurality of individual layers and the third plurality of individual layers are arranged in the layer stack to reproduce a diffraction-limited modulation transfer function of a respective digital twin of a gradient-index spectacle lens.

Typically, a difference between a) the first uniform refractive index and the second uniform refractive index, or b) the first uniform refractive index and the third uniform refractive index, or c) the second uniform refractive index and the third uniform refractive index, each is selected from at least one of the following:

- a refractive index difference of at least 0.05;
- a refractive index difference of at least 0.1;
- a refractive index difference of at least 0.15;
- a refractive index difference of at least 0.2;
- a refractive index difference of at least 0.21.

In the digital twin of a gradient-index spectacle lens a refractive index distribution n(x,y,z) is limited by the first uniform refractive index, the second uniform refractive index and the third uniform refractive index. In the digital twin of the gradient-index spectacle lens a refractive index distribution n(x,y,z) is preset. The digital twin of the gradient-index spectacle lens is sliced in that an optical path length through a layer stack thereof is in each position or in each discrete position equal to an optical path length in a respective position or a respective discrete position of the digital twin, as described before. In the digital twin of the gradient-index spectacle lens a first plurality of individual layers, each individual layer thereof having a non-uniform layer thickness with a spatial variation and a first uniform refractive index, a second plurality of individual layers, each individual layer thereof having a non-uniform layer thickness with a spatial variation and a second uniform refractive index, and a third plurality of individual layers, each individual layer thereof having a non-uniform layer thickness with a spatial variation and a third uniform refractive index are arranged in that an effective refractive index in each position or in each discrete x,y,z position meets the preset refractive index distribution n(x,y,z) of the digital twin. The effective refractive index depends on the first uniform refractive index, the second uniform refractive index, the third uniform refractive index and a ratio of the non-uniform layer thicknesses as exemplified in the following with respect to a three layer stack. An optical path length of a vertically incident light beam through a three layer stack consisting of a) a first individual layer having a non-uniform layer thickness $d_1$ with a spatial variation and a first uniform refractive index $n_1$, b) a second individual layer having a non-uniform layer thickness $d_2$ with a spatial variation and a second uniform refractive index $n_2$, and c) a third individual layer having a non-uniform layer thickness $d_3$ with a spatial variation and a second uniform refractive index $n_3$, the vertically incident light beam entering the three layer stack in a point on a surface of the first individual layer and leaving the three layer stack on a perpendicular point on a surface of the third individual layer is defined as: optical path length=$d_1 n_1 + d_2 n_2 + d_3 n_3 = (d_1 + d_2 + d_3) n_{eff}$, wherein $n_{eff}$=effective refractive index.

With $d_2 = a_1 d_{min}$, $a_1 \geq 1$, $d_{min}$=minimal layer thickness; $d_2 = a_2 d_{min}$, $a_2 \geq 1$; $d_3 = a_3 d_{min}$; $n_1 = n_0$, $n_0$=minimum refractive index; $n_2 = n_0 + bDn$, $0 < b < 1$, $Dn$=refractive index difference; $n_3 = n_0 + Dn$, an effective refractive index is determined as:

$$n_{eff} = n_0 + \frac{\beta \alpha_2 + \alpha_3}{\alpha_1 + \alpha_2 + \alpha_3} \Delta n$$

showing that the effective refractive index depends on the first uniform refractive index, the second uniform refractive index, the third uniform refractive index and a ratio of the non-uniform layer thicknesses.

In an exemplary embodiment of the disclosure, the computer-implemented method comprises at least one of the steps:

calculating a transition zone between a first individual layer having a first uniform refractive index and a second individual layer having a second uniform refractive index, the transition zone having a refractive index gradient, calculating a transition zone between a second individual layer having a second uniform refractive index and a first individual layer having a first uniform refractive index, the transition zone having a refractive index gradient.

The computer-implemented method being configured for calculating a digital twin of a spectacle lens for the purpose of a use of the digital twin for a manufacture of the spectacle lens, typically after having arranged a first plurality of individual layers and a second plurality of individual layers in a layer stack, comprises the step of calculating a transition zone between individual layers of a different refractive index.

Typically, a digital twin of a gradient-index spectacle lens is sliced in a layer stack in that an optical path length, typically of a vertically incident light beam or a nearly vertically incident light beam, through the layer stack is equal in each position or in each discrete position to a respective optical path length through the digital twin in a respective position or a respective discrete position, as explained before. The layer stack typically is sliced to comprise a) a first plurality of individual layers each having a non-uniform layer thickness and a first uniform refractive index and b) a second plurality of individual layers each having a non-uniform layer thickness and a second uniform refractive index, as described before. Dependent on an arrangement of the first plurality of individual layers and the second plurality of individual layers in the layer stack, the arrangement being such as to achieve optical path lengths of the digital twin, as described before, one interface or more interfaces between a) a first individual layer having a non-uniform layer thickness with a spatial variation and a first uniform refractive index and b) a second individual layer having a non-uniform layer thickness with a spatial variation and a second uniform refractive index exist.

Typically, after having sliced the digital twin of the gradient-index spectacle lens in a layer stack, and after having arranged the first plurality of individual layers and the second plurality of individual layers in the layer stack, a transition zone between a) a first individual layer having a non-uniform thickness with a spatial variation and a first uniform refractive index and b) a second individual layer having a non-uniform layer thickness with a spatial variation and a second uniform refractive index is calculated. The transition zone typically comprises an interface between the first individual layer and the second individual layer. The transition zone typically has a refractive index gradient.

Typically, the transition zone is calculated
to begin in a first individual layer having a non-uniform layer thickness with a spatial variation and a first uniform refractive index and to end in a second individual layer having a non-uniform layer thickness with a spatial variation and a second uniform refractive index, the transition zone typically comprising an interface between the first individual layer and the second individual layer, the transition typically having a refractive index gradient from the first uniform refractive index to the second uniform refractive index,
to begin in a second individual layer having a non-uniform layer thickness with a spatial variation and a second uniform refractive index and to end in a first individual layer having a non-uniform layer thickness with a spatial variation and a first uniform refractive index, the transition zone typically comprising an interface between the second individual layer and the first individual layer, the transition typically having a refractive index gradient from the second uniform refractive index to the first uniform refractive index.

A transition zone may be calculated a) to begin in the first individual layer and to end in the second individual layer or b) to begin in the second individual layer and to end in the first individual layer.

Typically, a) a transition zone is calculated to begin in the first individual layer and to end in the second individual layer and b) a transition zone is calculated to begin in the second individual layer and to end in an adjacent first individual layer, adjacent to the second individual layer and not being the first individual layer.

Typically, a transition zone is calculated for each interface between a) a first individual layer having a non-uniform layer thickness with a spatial variation and a first uniform refractive index and b) a second individual layer having a non-uniform layer thickness with a spatial variation and a second uniform refractive index.

In case a digital twin of a gradient-index spectacle lens is sliced to comprise in a layer stack at least
a stack A, the stack A comprising a plurality of individual layers each of non-uniform layer thickness with a spatial variation and a first uniform refractive index,
adjacent to the stack A, a stack B, the stack B comprising a plurality of individual layers each of non-uniform layer thickness with a spatial variation and a second uniform refractive index,
adjacent to the stack B, a stack C, the stack C comprising a plurality of individual layers each of non-uniform layer thickness with a spatial variation and the first uniform refractive index.

In this case, a transition zone may be calculated to a) begin in the stack A and to end in the stack B, or b) to begin in the stack B and to end in the stack C. Typically, a) a transition zone is calculated to begin in the stack A and to end in the stack B and b) a transition zone is calculated to begin in the stack B and to end in the stack C.

Figure 2:
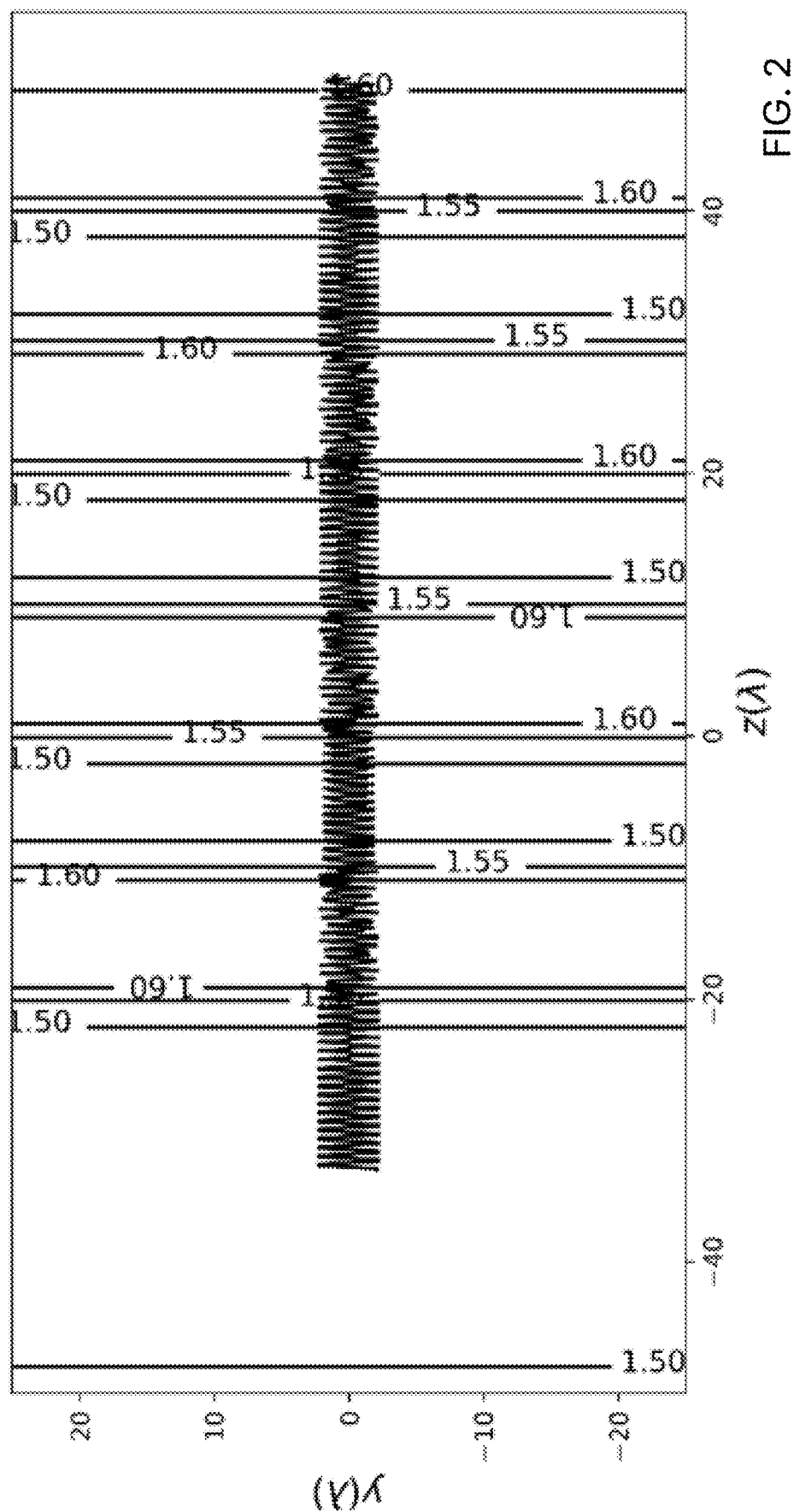
FIG. 2 shows a wave optical simulation of a light ray propagating through a layer stack of a sliced digital twin of a gradient-index spectacle lens.

Typically, a transition zone for an interface between adjacent individual layers of a different refractive index, each of the adjacent individual layers having a non-uniform layer thickness with a spatial distribution and a uniform refractive index, is calculated such that in a wave optical simulation of a light ray propagating through a layer stack of a sliced digital twin of a gradient-index spectacle lens no light is reflected at the interface (FIG. 2). Typically, in the wave optical simulation a light ray of visible light (380 nm-780 nm) is propagated through the layer stack.

Typically, a transition zone is calculated for each interface between adjacent individual layers having a different refractive index, each of the adjacent individual layers having a non-uniform layer thickness with a spatial distribution and a uniform refractive index, in a layer stack of a sliced digital twin of a gradient-index spectacle lens. Each transition zone is typically calculated to obtain a wave optical simulation of the layer stack without light reflection at each interface.

Typically, a transition zone is calculated for each interface between adjacent individual layers having a different refractive index from each other, each of the adjacent individual layers having a non-uniform layer thickness with a spatial distribution and a uniform refractive index, independent of an interface in a layer stack of a sliced digital twin of a gradient-index spectacle lens being an interface between a) an individual layer L comprised in a stack, the stack comprising a plurality of individual layers each having a non-uniform layer thickness with a spatial distribution and an identical uniform refractive index, and b) an individual layer 1 not comprised in a stack, the individual layer 1 being adjacent to the individual layer L in the layer stack of the sliced digital twin;

an interface between a) an individual layer 2 and b) an individual layer 3, the individual layer 3 having a uniform refractive index which is different to a uniform refractive index of the individual layer 2;

an interface between a) an individual layer M comprised in a stack N, the stack N comprising a plurality of individual layers each having a non-uniform layer thickness with a spatial distribution and an identical uniform refractive index, and b) an adjacent individual layer O comprised in a stack P, the stack P comprising a plurality of individual layers each having a non-uniform layer thickness with a spatial distribution and an identical uniform refractive index, the adjacent individual layer O having a uniform refractive index which is different to a uniform refractive index of the individual layer M.

In a sliced digital twin of a gradient-index spectacle lens, a) a plurality of first individual layers each having a non-uniform layer thickness with a spatial distribution and a first uniform refractive index and b) a plurality of second individual layers each having a non-uniform layer thickness with a spatial distribution and a second uniform refractive index may be arranged in a layer stack of the digital twin to comprise a stack of individual layers having a non-uniform layer thickness with a spatial distribution and a same uniform refractive index. In the layer stack of the digital twin adjacent individual layers of a same uniform refractive index are typically understood as different individual layers.

Typically, a transition zone has a same thickness over its entire spatial expansion. Typically, a transition has a constant thickness over its entire spatial expansion in a range from 800 nm to 1200 nm, further typically from 850 nm to 1150 nm, more typically from 900 nm to 1100 nm and most typically from 950 nm to 1050 nm.

When a gradient-index spectacle lens is manufactured, typically by an additive manufacturing method, thereby considering a calculated transition zone, the transition zone effects in the gradient-index spectacle lens that Fresnel reflection losses at an interface are reduced. When a gradient-index spectacle lens is typically inkjet printed according to printing instructions considering a calculated transition zone, the transition zone effects that in the inkjet printed gradient-index spectacle lens Fresnel reflection losses at an interface are reduced.

In case a digital twin of a gradient-index spectacle lens is calculated to comprise one or more transition zones, a difference in refractive index between an individual layer having a first uniform refractive index and an individual layer having a second refractive index is neglectable. However, a limiting factor with respect to refractive index is that the materials for manufacturing such individual layers, in particular fluids to inkjet print individual layers with a respective refractive index should be available.

In an exemplary embodiment of the disclosure, the computer-implemented method comprises at least one of the steps:

calculating a transition zone between a first individual layer having a first uniform refractive index and a second individual layer having a second uniform refractive index, the transition zone having a refractive index gradient, calculating a transition zone between a second individual layer having a second uniform refractive index and a first individual layer having a first uniform refractive index, the transition zone having a refractive index gradient, calculating a transition zone between a first individual layer having a first uniform refractive index and a third individual layer having a third uniform refractive index, the transition zone having a refractive index gradient, calculating a transition zone between a third individual layer having a third uniform refractive index and a first individual layer having a first uniform refractive index, the transition zone having a refractive index gradient, calculating a transition zone between a second individual layer having a second uniform refractive index and a third individual layer having a third uniform refractive index, the transition zone having a refractive index gradient, calculating a transition zone between a third individual layer having a third uniform refractive index and a second individual layer having a second uniform refractive index, the transition zone having a refractive index gradient.

The computer-implemented method being configured for calculating a digital twin of a spectacle lens for the purpose of a use of the digital twin for a manufacture of the spectacle lens, typically after having arranged a first plurality of individual layers each having a non-uniform layer thickness with a spatial variation and a first uniform refractive index, a second plurality of individual layers each having a non-uniform layer thickness with a spatial variation and a second uniform refractive index, and a third plurality of individual layers each having a non-uniform layer thickness with a spatial variation and a third uniform refractive index in a layer stack in that as to reproduce respective optical path lengths in respective positions or in respective discrete positions through the spectacle lens or through a digital twin of the spectacle lens, the method comprises the step of calculating a transition zone between individual layers of a different refractive index.

Typically, a digital twin of a gradient-index spectacle lens is sliced to comprise the first plurality of individual layers, the second plurality of individual layers and the third plurality of individual layers in a layer stack, the first, second and third plurality of individual layers arranged to reproduce respective optical path lengths in respective positions or respective discrete positions through the digital twin. Arranging the first, second and third plurality of individual layers in the layer stack result in more interfaces between individual layers of a different refractive index. Typically, for the avoidance of Fresnel reflection losses at an interface between individual layers of different refractive indices a transition zone for one or more of the interfaces is calculated, analogously to the before described, to begin in a first individual layer and to end in a second individual layer, the transition zone typically comprising an interface between the first individual layer and the second individual layer, the transition zone typically having a refractive index gradient from a first uniform refractive index to a second uniform refractive index, to begin in a second individual layer and to end in a first individual layer, the transition zone typically comprising an interface between the second individual layer and the first individual layer, the transition zone typically having a refractive index gradient from a second uniform refractive index to a first uniform refractive index, to begin in a first individual layer and to end in a third individual layer, the transition zone typically comprising an interface between the first individual layer and the third individual layer, the transition zone typically having a refractive index gradient from a first uniform refractive index to a third uniform refractive index, to begin in a third individual layer and to end in a first individual layer, the transition zone typically comprising an interface between the third individual layer and the first individual layer, the transition zone typically having a refractive index gradient from a third uniform refractive index to a first uniform refractive index, to begin in a second individual layer and to end in a third individual layer, the transition zone typically comprising an interface between the second individual layer and the third individual layer, the transition zone typically having a refractive index gradient from a second uniform refractive index to a third uniform refractive index, to begin in a third individual layer and to end in a second individual layer, the transition zone typically comprising an interface between the third individual layer and the second individual layer, the transition zone typically having a refractive index gradient from a third uniform refractive index to a second uniform refractive index.

Typically, a transition is calculated for each interface between individual layers of a different refractive index. Considering, for example, a four layer stack consisting of a first individual layer having a first uniform refractive index and being adjacent to a second individual layer having a second uniform refractive index, the second individual layer further being adjacent to a third individual layer having a third uniform refractive index, the third individual layer finally being further adjacent to a further first individual layer having a first uniform refractive index. In the exemplarily four layer stack, a first transition zone is calculated to begin in the first individual layer and to end in the second individual layer, the first transition zone comprising an interface between the first individual layer and the second individual layer and the transition zone having a refractive index gradient from the first uniform refractive index to the second uniform refractive index, a second transition zone is calculated to begin in the second individual layer and to end in the third individual layer, the second transition zone comprising an interface between the second individual layer and the third individual layer and the transition zone having a refractive index gradient from the second uniform refractive index to the third uniform refractive index, a third transition zone is calculated to begin in the third individual layer an to end in the further first individual layer, the third transition zone comprising an interface between the third individual layer and the further first individual layer and the transition zone having a refractive index gradient from the third uniform refractive index to the first uniform refractive index.

Irrespective of an individual layer being part of a stack of a plurality of individual layers of an identical uniform refractive index or irrespective of an individual layer being a single individual layer, typically, for one or more interfaces between adjacent individual layers of a different refractive index, each of the adjacent individual layers having a non-uniform layer thickness with a spatial distribution and a uniform refractive index, a transition zone is calculated. Typically, for each interface between adjacent individual layers of a different refractive index, each of the adjacent individual layers having a non-uniform layer thickness with a spatial distribution and a uniform refractive index, a transition zone is calculated.

Typically, a transition zone for an interface, typically for each interface, between adjacent individual layers of a different refractive index, each of the adjacent individual layers having a non-uniform layer thickness with a spatial distribution and a uniform refractive index, is calculated such that in a wave optical simulation of a light ray propagating through a layer stack of a sliced digital twin of a gradient-index spectacle lens no light is reflected at the interface, typically at each of the interfaces. Typically, in the wave optical simulation a light ray of visible light (380 nm-780 nm) is propagated through the layer stack.

Typically, a transition zone has a same thickness over its entire spatial expansion. Typically, a transition has a constant thickness over its entire spatial expansion in a range from 800 nm to 1200 nm, further typically from 850 nm to 1150 nm, more typically from 900 nm to 1100 nm and most typically from 950 nm to 1050 nm.

In an exemplary embodiment of the disclosure, the computer-implemented method is wherein a spatial variation of a layer thickness of an individual layer comprises a minimum layer thickness and a maximum layer thickness having a ratio selected from at least one of the following:

a) a ratio of a minimum layer thickness to a maximum layer thickness of at least 1:5;

b) a ratio of a minimum layer thickness to a maximum layer thickness of at least 1:8;

c) a ratio of a minimum layer thickness to a maximum layer thickness of at least 1:10;

d) a ratio of a minimum layer thickness to a maximum layer thickness of at least 1:12;

e) a ratio of a minimum layer thickness to a maximum layer thickness of at least 1:15.

The computer-implemented method being configured for calculating a digital twin of a spectacle lens for the purpose of a use of the digital twin for a manufacture of the spectacle lens comprises the step of:

setting a spatial variation of a layer thickness of an individual layer to comprise one of the before mentioned ratios between a minimum layer thickness and a maximum layer thickness.

Setting a spatial variation of a layer thickness of an individual layer to comprise one of the before mentioned ratios between a minimum layer thickness and a maximum layer thickness advantageously enables a higher flexibility in calculating the digital twin of the spectacle lens, in particular with respect to a realization of a refractive index distribution. Typically, in a layer stack of a digital twin of a spectacle lens more than 90%, further typically more than 92%, more typically more than 95% of all individual layers are set to comprise one of the before mentioned ratios. In the layer stack of the digital twin of the spectacle lens the individual layers may be set to comprise a same of the before mentioned ratios or different individual layers may be set to comprise different of the before mentioned ratios.

Typically, the ratio between the minimum layer thickness and the maximum layer thickness starts in one of the before mentioned ratios and ends in a ratio between the minimum layer thickness and the maximum layer thickness of 1:20, typically 1:25.

For example, the higher the ratio between a minimum layer thickness and a maximum layer thickness of the individual layer is, the higher a refractive index gradient realizable in the layer stack of the digital twin of the spectacle lens is, the layer stack comprising a) a first plurality of individual layers each having a non-uniform layer thickness with a spatial variation and a first uniform refractive index and b) a second plurality of individual layers each having a non-uniform layer thickness with a spatial variation and a second uniform refractive index being different to the first uniform refractive index. Typically, in the layer stack more than 90%, typically more than 92%, further typically more than 95% of all individual layers, i.e., the first plurality and the second plurality of individual layers, are having one of the before mentioned ratios.

The ratios between a maximum layer thickness to a minimum layer thickness of at least 1.05, at least 1.1, at least 1.2, at least 1.3, at least 1.5, disclosed in WO 2020/165439 A1, page 21, lines 1 to 4, are not allowing the high flexibility in calculating a digital twin of a spectacle lens as the before mentioned ratios do.

In a digital twin of a gradient-index spectacle lens a refractive index distribution n(x,y,z) is preset. In a layer stack of the digital twin, the layer stack comprising i) a first plurality of individual layers each having a non-uniform layer thickness with a spatial distribution and a first uniform refractive index and ii) a second plurality of individual layers each having a non-uniform layer thickness with a spatial distribution and a second uniform refractive index, a cut, for example along a line of sight (12 in FIG. 1), through the layer stack shows a refractive index distribution n(x,y). The line of sight is defined in ISO 13666:2019(E), section 3.2.4, as ray path from the point of interest (i.e., point of fixation) in object space to the centre of the entrance pupil of the eye and its continuation in image space from the centre of the exit pupil to the retinal point of fixation (generally the foveola). A line of sight in a digital twin of a spectacle shall analogously to ISO 13666:2019(E), section 3.2.4, describe a ray path from the point of interest (i.e., point of fixation) in object space to the centre of the virtually represented entrance pupil of the virtually represented eye and its continuation in image space from the centre of the virtually represented exit pupil to the virtually represented retinal point of fixation (generally the foveola). The refractive index distribution n(x,y) is responsible for a gradient index orthogonal to the viewing direction, when the digital twin has been been manufactured, typically by an additive manufacturing method, further typically inkjet printed as gradient-index spectacle lens.

Considering exemplarily a two layer stack consisting of a) a first individual layer having a non-uniform layer thickness with a spatial distribution and a first uniform refractive index and b) a second individual layer having a non-uniform layer thickness with a spatial distribution and a second uniform refractive index. Considering in the two layer stack for each individual layer a preset maximum layer thickness $\alpha_{max} d_{min}$ and a preset minimum layer thickness $d_{min}$, and presetting a refractive index n for an arbitrarily selected point $x_a$ on a surface of the first individual layer:

n=$n_0$+φDn, with 0≤φ≤1;

a refractive indeex gradient γ of the two layer stack with respect to the point $x_a$:

$$\gamma = \frac{n(x_b) - n(x_a)}{\Delta n}$$

a total thickness $d(x_a)$ of the two layer stack: $d(x_a)$= $(a_{1,a}+a_{2,a})d_{min}$, with $a_{1,a}d_{min}$ being a layer thickness of the first individual layer with respect to the point $x_a$, $a_{2,a}d_{min}$ being a layer thickness of a second individual layer with respect to the point $x_a$, and further presetting a layer thickness $d(x_b)$ of the two layer stack for another point $x_b$ on the surface as $d(x_b)=(a_{b,1}+a_{b,2})d_{min}$, with $a_{b,1}d_{min}$ being a layer thickness of the first individual layer with respect to the point $x_b$, $a_{b,2}d_{min}$ being a layer thickness of the second individual layer with respect to the point $x_b$, then $$a_{b,1} = (1 - (\varphi + \gamma))d(x_b)/d_{min}$$

$$a_{b,2} = (\varphi + \gamma)d(x_b)/d_{min}$$

With respect to the point $x_a$ or with respect to the point $x_b$ means in a plane perpendicular to, for example, a line of sight through the point $x_a$ or through the point $x_b$.

With the before mentioned predefinitions of a refractive index for an arbitrarily selected point $x_a$ on the surface of the first individual layer, a refractive index gradient of the two layer stack with respect to the point $x_a$, and a preset spatial thickness distribution of the two layer stack, the layer thicknesses for the first individual layer and the second individual layer for each further point $x_b$, $x_c$, . . . on the first individual layer are uniquely determined.

Transferred to a layer stack of a sliced digital twin of a gradient-index spectacle lens, the layer stack comprising i) a first plurality of individual layers each having a non-uniform layer thickness with a spatial distribution and a first uniform refractive index and ii) a second plurality of individual layers each having a non-uniform layer thickness with a spatial distribution and a second uniform refractive index, this means that an achievable refractive index distribution n(x,y,z) and a spatial distribution of a layer thickness of an individual layer typically already is considered in designing a digital twin of a gradient-index spectacle lens. Also to be considered is that the digital is transferrable in physical reality, typically that the digital twin is manufacturable by an additive manufacturing method, further typically that the digital twin is inkjet printable.

In a layer stack of a digital twin of a gradient-index spectacle lens, the digital twin having a preset refractive index distribution n(x,y,z), the layer stack comprising i) a first plurality of individual layers each having a non-uniform layer thickness with a spatial distribution and a first uniform refractive index, ii) a second plurality of individual layers each having a non-uniform layer thickness with a spatial distribution and a second uniform refractive index and iii) a third plurality of individual layers each having a non-uniform layer thickness with a spatial distribution and a third uniform refractive index, a cut, for example along a line of sight, through the layer stack shows a refractive index distribution n(x,y).

Considering exemplarily a three layer stack consisting of a) a first individual layer having a non-uniform layer thickness with a spatial distribution and a first uniform refractive index, b) a second individual layer having a non-uniform layer thickness with a spatial distribution and a second uniform refractive index and c) a third individual layer having a non-uniform layer thickness with a spatial distribution and a third uniform refractive index. For an arbitrarily selected point $x_a$ on a surface of the first individual layer considering a preset total thickness $d(x_a)$ of the three layer stack in the point $x_a$: $d(x_a)=d_a d_{min}$, $d_a=a_{a,1}+a_{a,2}+a_{a,3}$, with $a_{a,1}d_{min}$ being a layer thickness of the first individual layer with respect to the point $x_a$, $a_{a,2}d_{min}$ being a layer thickness of the second individual layer with respect to the point $x_a$, $a_{a,3}d_{min}$ being a layer thickness of the third individual layer with respect to the point $x_a$, a preset refractive index $n(x_a)$ in the point $x_a$: $n(x_a)=n_0+\varphi Dn$, with $0 \leq \varphi \leq 1$, results in $a_{a,1}=(1-\varphi)d_a-(1-b)a_{a,2}$ and $a_{a,3}=\varphi d_a-ba_{a,2}$ with $a_i \geq 1$ and $a_i \leq a_{max}$, i=1,2,3.

For a different arbitrarily selected point $x_b$ on the surface considering a preset total thickness $d(x_a)$ of the three layer stack in the point $x_b$: $d(x_b)=d_b d_{min}$, $d_b=a_{b,1}+a_{b,2}+a_{b,3}$, with $a_{b,1}d_{min}$ being a layer thickness of the first individual layer with respect to the point $x_b$, $a_{b,2}d_{min}$ being a layer thickness of the second individual layer with respect to the point $x_b$, $a_{b,3}d_{min}$ being a layer thickness of the third individual layer with respect to the point $x_b$, a preset refractive index $n(x_b)$ in the point $x_b$: $n(x_b)=n_0+\varphi Dn$, with $0 \leq \varphi \leq 1$, results in $a_{b,1}(1-\varphi)d_b-(1-b)a_{b,2}$ and $a_{b,3}=(\varphi+g)d_b-ba_{b,2}$ with $a_i \geq 1$ and $a_i \leq a_{max}$, i=1,2,3, and a refractive index gradient:

$$\frac{d_n}{d_x} = \frac{\gamma \Delta n}{\|x_b - x_a\|}$$

Presetting a total thickness $d(x_a)$ of the three layer stack in the point $x_a$ and additionally presetting a) a total thickness $d(x_b)$ of the three layer stack in the point $x_b$ and b) a refractive index in the point $x_b$ determines not uniquely the layer thicknesses for the first individual layer, the second individual layer and the third individual layer for each further point $x_c$, $x_d$, . . . on the first individual layer, in contrast to a two layer stack as explained before.

In a layer stack of a digital twin of a gradient-index spectacle lens, the digital twin having a preset refractive index distribution n(x,y,z), the layer stack comprising more than three individual layers, each individual layer having a non-uniform layer thickness and a uniform refractive index, further degrees of freedom can be utilized for slicing the digital twin.

In an exemplary embodiment of the disclosure, the computer-implemented method comprises the step of
determining a spatial variation such that an optical path length through a pair of adjacent individual layers, each of the adjacent individual layers having a uniform refractive index which is different from each other, equals in each position an optical path length through a respective gradient index layer.

A digital twin of a spectacle lens is calculated in that an optical path length through two adjacent individual layers of a different refractive index is in each position equivalent to an optical path length through a respective gradient index layer in a respective position.

A digital twin of a spectacle lens is sliced in a layer stack, the layer stack comprising a plurality of individual layers each having a non-uniform layer thickness with a spatial distribution and a uniform refractive index, as explained before. A digital twin of a spectacle lens is sliced in a layer stack such that an optical path length, typically of a vertically incident light beam or a nearly vertically incident light beam, through each pair of individual layers of a different refractive index is in each position or in each discrete x,y,z position equivalent to an optical path length, typically of a vertically incident light beam or a nearly vertically incident light beam, through a respective gradient index layer to each of the pairs of individual layers in a respective position or a respective discrete x,y,z position.

In an exemplary embodiment of the disclosure, the computer-implemented method comprises the step of
determining a spatial variation such that a form of an interface is a linear combination of a lens surface of a front surface of a spectacle lens and a lens surface of a back surface of a spectacle lens.

In an exemplary embodiment of the disclosure, the computer-implemented method comprises the step of
slicing a digital twin of a spectacle lens such that a form of an interface is a linear combination of a lens surface of a front surface of the digital twin and a lens surface of a back surface of the digital twin.

In an exemplary embodiment of the disclosure, the computer-implemented method comprises the step of
determining a spatial variation such that a form of an interface is a linear combination of a lens surface of a front surface of a spectacle lens and a lens surface of a back surface of a spectacle lens, thereby considering a uniform refractive index of an individual layer and a different uniform refractive index of an adjacent individual layer having an interface in common.

In an exemplary embodiment of the disclosure, the computer-implemented method comprises the step of
slicing a digital twin of a spectacle lens such that a form of an interface is a linear combination of a lens surface of a front surface of the digital twin and a lens surface of a back surface of the digital twin, thereby considering a uniform refractive index of an individual layer and a different uniform refractive index of an adjacent individual layer having an interface in common.

The before mentioned four exemplary embodiments of the disclosure are explained in the following with respect to a sliced digital twin of a spectacle lens:

A digital twin of a spectacle lens is sliced in a layer stack, the layer stack comprising i) a first plurality of individual layers each having a non-uniform layer thickness with a spatial variation and a first uniform refractive index and ii) a second plurality of individual layers each having a non-uniform layer thickness with a spatial variation and a second uniform refractive index, as explained before. In the layer stack a form of every second interface is determined by a linear combination of a lens surface of a front surface of the digital twin and a lens surface of a back surface of the digital twin, as explained before. In the layer stack a form of every other interface is determined by a linear combination of a lens surface of a front surface of the digital twin and a lens surface of a back surface of the digital twin, thereby considering a uniform refractive index of both individual layers having the every second interface in common.

A digital twin of a spectacle lens is sliced in a layer stack, typically in three steps. In a first step the digital twin is sliced in a first layer stack in that a form of each interface (02 in FIG. 1) results from a linear combination of a lens surface of a front surface of the digital twin and a lens surface of a back surface of the digital twin. In the first layer stack an individual layer (09 in FIG. 1) is formed by the front surface of the digital twin and a closest interface, or by two closest interfaces, or by the back surface of the digital twin and a closest interface. In a second step each individual layer of the first layer stack is sliced to result in a second layer stack of the digital twin. In the second step each individual layer of the first layer stack is sliced to comprise a first inner interface (03 in FIG. 1). A form of the first inner interface is determined by dividing each individual layer of the first layer stack in a first partial layer (10 in FIG. 1) having a first uniform refractive index and a second partial layer (11 in FIG. 1) having a second uniform refractive index. The division of each individual layer in the first partial layer and the second partial layer is such that an optical path length through the first and second partial layer, typically of a vertically incident light beam or of a nearly vertically incident light beam, is in each position or in each discrete x,y position of each individual layer of the first layer stack equivalent to an optical path length through a respective gradient index layer in a respective position or a respective discrete x,y position. In the respective gradient index layer the gradient index is between the first uniform refractive index and the second uniform refractive index, as explained before. The division of each individual layer in the first partial layer and the second partial layer is such that a partial layer thickness $t_{(x,y) \text{ first partial layer}}$ of the first partial layer is determined in each position or in each discrete x,y position by $$t_{(x,y) \text{ first partial layer}} = \frac{n(x, y) - n_2}{n_1 - n_2},$$

with n(x,y)=refractive index of the digital twin in the position or in the discrete x,y position, $n_1$=first uniform refractive index of the first partial layer, $n_2$=second uniform refractive index of the second partial layer, $n_1 \neq n_2$. The division of each individual layer in the first partial layer and the second partial layer is such that a partial layer thickness $t_{(x,y) \text{ second partial layer}}$ of the second partial layer is determined in each position or in each discrete x,y position by $$t_{(x,y) \text{ second partial layer}} = \frac{n_1 - n_{(x,y)}}{n_1 - n_2},$$

with n(x,y)=refractive index of the digital twin in the position or in the discrete x,y position, $n_1$=first uniform refractive index of the first partial layer, $n_2$=second uniform refractive index of the second partial layer, $n_1 \neq n_2$.

The first uniform refractive index typically is a high uniform refractive index, typically a constant uniform refractive index of >1.50, typically at 550 nm. The second uniform refractive index typically is a low uniform refractive index, typically a constant uniform refractive index of ≤1.50, typically at 550 nm.

In a third step each individual layer (10, 11 in FIG. 1) of the second layer stack is sliced to result in a third layer stack. In the third step each individual layer comprised in the second layer stack is sliced to comprise one second inner interface (04, 05 in FIG. 1) or more second inner interfaces. In the second layer stack an individual layer is formed by i) the front surface of the digital twin and a closest first inner interface or the front surface of the digital twin and a closest interface, or ii) by a first inner interface and a closest interface, or iii) the back surface of the digital twin and a closest first inner interface or the back surface of the digital twin and a closest interface. In the third step a layer, whichever applies, formed by the front surface of the digital twin and a closest first inner interface is sliced to comprise one second inner interface or more second inner interfaces, each form of a second inner interface being determined by a linear combination of a lens surface of the front surface and a form of the closest first inner interface, formed by the front surface of the digital twin and a closest interface is sliced to comprise one second inner interface or more second inner interfaces, each form of a second inner interface being determined by a linear combination of a lens surface of the front surface and a form of the closest interface, formed by a first inner interface and a closest interface is sliced to comprise one second inner interface or more second inner interfaces, each form of a second inner interface being determined by a linear combination of a form of the first inner interface and a form of the closest interface, formed by the back surface of the digital twin and a closest first inner interface is sliced to comprise one second inner interface or more second inner interfaces, each form of a second inner interface being determined by a linear combination of a surface form of the back surface and a form of the closest first inner interface, formed by the back surface of the digital twin and a closest interface is sliced to comprise one second inner interface or more second inner interfaces, each form of a second inner interface being determined by a linear combination of a surface form of the back surface and a form of the closest interface.

Determining the spatial distribution or slicing the digital twin as described with respect the above four exemplary embodiments ensures that the digital twin is transferrable in physical reality, typically is manufacturable by an additive manufacturing method, further typically is inkjet printable.

Figure 3:
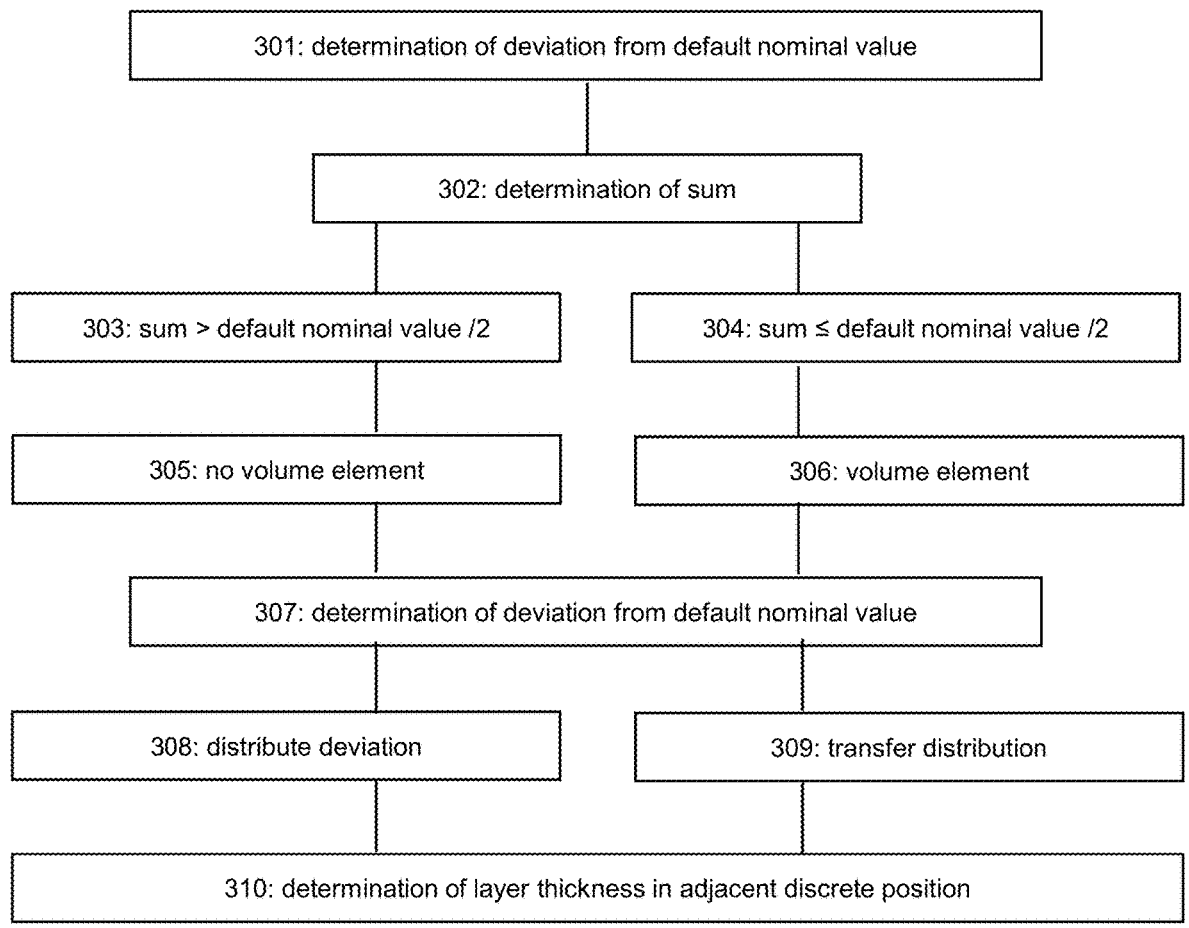
FIG. 3 shows a flow chart visualizing a proceeding with a deviation in a layer thickness.

As shown in the exemplary embodiment of FIG. 3, the computer-implemented method comprises the following steps, typically in the given order:

determining 301 a deviation of an actual value of a layer thickness in a discrete $x_m, y_m, z_m \ldots x_n, y_n, z_n$ position of an individual layer from a default nominal value of the layer thickness in an identical discrete $x_m, y_m, z_m \ldots x_n, y_n, z_n$ position of the individual layer, and determining 302 a sum of the deviation and the actual value of the layer thickness.

As explained before with respect to the generation of printing instructions, step b), each individual layer of a layer stack of a sliced digital twin of a spectacle lens is converted into a spatial volume element pattern. In the spatial volume element pattern each volume element is positioned or not positioned in a discrete $x_m, y_m, z_m \ldots x_n, y_n, z_n$ position according to a spatial variation of a non-uniform layer thickness of each individual layer of the layer stack.

To "position" a volume element in a discrete $x_m, y_m, z_m \ldots x_n, y_n, z_n$ position means to digitally place or to virtually arrange or to digitally distribute a volume element in a discrete $x_m, y_m, z_m \ldots x_n, y_n, z_n$ position. To position a volume element in a discrete $x_m, y_m, z_m \ldots x_n, y_n, z_n$ position typically includes (i) to digitally place a volume element within an individual layer and/or (ii) to digitally place a volume element in an adjacent individual layer, in a next but one individual layer, in an adjacent individual layer to a next but one individual layer, and so on. To position a volume element shall include to position one volume element in a discrete $x_m, y_m, z_m \ldots x_n, y_n, z_n$ position or to position more volume elements in a discrete $x_m, y_m, z_m \ldots x_n, y_n, z_n$ position. "Not to position" a volume element shall mean that in a discrete $x_m, y_m, z_m \ldots x_n, y_n, z_n$ position no volume element is positioned.

A volume element may be digitally represented or virtually described or digitally displayed for example as cuboid with preset edge lengths. Typically, a volume element is digitally represented as cube with a preset edge length.

As explained before slicing a digital twin of a spectacle lens into a layer stack comprises a determination of the spatial distribution of the non-uniform layer thickness of each individual layer. For each discrete $x_m, y_m, z_m \ldots x_n, y_n, z_n$ position of each individual layer a layer thickness is determined. The layer thickness has in each discrete $x_m, y_m, z_m \ldots x_n, y_n, z_n$ position of an individual layer a default nominal value.

Typically, when projecting the layer stack in a plane held by an x direction and a y direction and when viewing the spatial volume element pattern of each individual layer of the layer stack for example in side view then in each discrete $x_m, y_m, z_m \ldots x_n, y_n, z_n$ position of an individual layer an actual value of a layer thickness is determined. Positioning of one volume element or more volume elements in a discrete $x_m, y_m, z_m \ldots x_n, y_n, z_n$ position of an individual layer results, when viewing the individual layer in side view, in an actual value of a layer thickness in the discrete $x_m, y_m, z_m \ldots x_n, y_n, z_n$ position that is larger than a default nominal value of a layer thickness in an identical discrete $x_m, y_m, z_m \ldots x_n, y_n, z_n$ position of the individual layer, or smaller than a default nominal value of a layer thickness in an identical discrete $x_m, y_m, z_m \ldots x_n, y_n, z_n$ position of the individual layer, or equal to a default nominal value of a layer thickness in an identical discrete $x_m, y_m, z_m \ldots x_n, y_n, z_n$ position of the individual layer.

A deviation of the actual value to the default nominal value is a difference between these two values.

A determination of a sum of the deviation and the actual value of the layer thickness is used as valid basis for i) positioning a volume element in a discrete $x_{m+1}, y_{m+1}, z_{m+1} \ldots x_{n+1}, y_{n+1}, z_{n+1}$ position of an individual layer or ii) not positioning a volume element in a discrete $x_{m+1}, y_{m+1}, z_{m+1} \ldots x_{n+1}, y_{n+1}, z_{n+1}$ position of an individual layer. Thus, the determination is used for deciding if a volume element is to be positioned or is not to be positioned in an individual layer adjacent and on top of a volume element in a discrete $x_m, y_m, z_m \ldots x_n, y_n, z_n$ position of an individual layer in which one volume element or more volume element has or have been positioned.

When projecting the layer stack in a plane held by an x direction and a y direction, a volume element having a discrete $x_{m+1}, y_{m+1}, z_{m+1} \ldots x_{n+1}, y_{n+1}, z_{n+1}$ position in an individual layer is directly adjacent and on top of a volume element having a discrete $x_m, y_m, z_m \ldots x_n, y_n, z_n$ position in an adjacent individual layer in which one volume element or more volume elements has or have been positioned, if the two volume elements differ only in their z position.

The steps of the computer-implemented method, determining a deviation of an actual value of a layer thickness from a default nominal value of the layer and determining a sum of the deviation and the actual value of the layer thickness, are performed for each individual layer of the layer stack except of the final individual layer.

In an exemplary embodiment of the disclosure, the computer-implemented method is characterized by at least one of the following conditions:

when the sum is larger, 303, than half the default nominal value of the layer thickness then no volume element is positioned in a discrete $x_{m+1}, y_{m+1}, z_{m+1} \ldots x_{n+1}, y_{n+1}, z_{n+1}$ position of an individual layer;

when the sum is smaller, 304, than or equal to half the default nominal value of the layer thickness then a volume element is positioned in a discrete $x_{m+1}, y_{m+1}, z_{m+1} \ldots x_{n+1}, y_{n+1}, z_{n+1}$ position of an individual layer.

To position 306 a volume element in a discrete $x_{m+1}, y_{m+1}, z_{m+1} \ldots x_{n+1}, y_{n+1}, z_{n+1}$ position or not to position 305 a volume element in a discrete $x_{m+1}, y_{m+1}, z_{m+1} \ldots x_{n+1}, y_{n+1}, z_{n+1}$ position according to the condition corrects a deviation of an actual value of a layer thickness in a discrete $x_m, y_m, z_m \ldots x_n, y_n, z_n$ position of an adjacent individual layer from a default nominal value of the layer thickness in an identical discrete $x_m, y_m, z_m \ldots x_n, y_n, z_n$ position of the adjacent individual layer. Typically, in the adjacent individual layer one volume element or more volume elements is or are finally positioned. Typically, as mentioned before, a volume element is digitally represented as cuboid with preset edge length, typically as cube with preset edge length. The correction of the deviation may correct the actual value to correspond to the default nominal value, or undercorrect the actual value not to correspond to the default nominal value, or overcorrect the actual value not to correspond to the default nominal value.

Typically the correction of the deviation corrects the actual value to correspond to the default nominal value.

In case the correction of the deviation would result in either an undercorrection or an overcorrection of the actual value the undercorrection or the overcorrection is distributed in equal parts. The distribution in equal parts is typically done while manufacturing a spectacle lens in layers such as a total volume of material positioned in an individual layer typically is equivalent to a volume of the individual layer. The distribution in equal parts is further typically done while inkjet printing a spectacle lens in layers, typically according to the before described printing instructions, such as a total volume of ink droplets to be positioned in an individual layer typically is equivalent to a volume of the individual layer.

When (i) positioning a volume element or (ii) not positioning a volume element according to the condition a maximum distance between two adjacent volume elements in an individual layer is considered. The maximum distance typically is a distance corresponding to a distance allowing a coalescence of adjacent ink droplets thus forming a continuous layer.

Further, when (i) positioning a volume element or (ii) not positioning a volume element according to the condition a variation in a distance between two adjacent volume elements in an individual layer typically is minimized. When typically inkjet printing a spectacle lens in layers considering the minimized variation in a distance between two adjacent ink droplets in an individual layer typically enables a smoothest possible surface of the individual layer. The conditions of the computer-implemented method, deciding upon the sum to position or not to position a volume element, are performed for each individual layer of the layer stack except of the final individual layer.

In an exemplary embodiment of the disclosure, the computer-implemented method is further characterized by at least one of the steps selected from:

determining a deviation 307 of a default nominal value of a layer thickness in the discrete $x_{m+1}, y_{m+1}, z_{m+1} \ldots x_{n+1}, y_{n+1}, z_{n+1}$ position of the individual layer following the positioning of a volume element and distributing 308 the deviation to an adjacent discrete $x_{o+1}, y_{o+1}, z_{o+1} \ldots x_{p+1}, y_{p+1}, z_{p+1}$ position within the identical individual layer;

determining a deviation of a default nominal value of a layer thickness in the discrete $x_{m+1}, y_{m+1}, z_{m+1} \ldots x_{n+1}, y_{n+1}, z_{n+1}$ position of the individual layer following the positioning of a volume element and transferring 309 the deviation to a discrete $x_{m+2}, y_{m+2}, z_{m+2} \ldots x_{n+2}, y_{n+2}, z_{n+2}$ position of a next but one individual layer;

determining a deviation of a default nominal value of a layer thickness in the discrete $x_{m+1}, y_{m+1}, z_{m+1} \ldots x_{n+1}, y_{n+1}, z_{n+1}$ position of the individual layer following the non-positioning of a volume element and distributing the deviation to an adjacent discrete $x_{o+1}, y_{o+1}, z_{o+1} \ldots x_{p+1}, y_{p+1}, z_{p+1}$ position within the identical individual layer;

determining a deviation of a default nominal value of a layer thickness in the discrete $x_{m+1}, y_{m+1}, z_{m+1} \ldots x_{n+1}, y_{n+1}, z_{n+1}$ position of the individual layer following the non-positioning of a volume element and transferring the deviation to a discrete $x_{m+2}, y_{m+2}, z_{m+2} \ldots x_{n+2}, y_{n+2}, z_{n+2}$ position of a next but one individual layer.

In case the individual layer is a final individual layer of the layer stack then distributing the deviation only is possible within the final individual layer. In case the next but one individual layer is a final individual layer of the layer stack then transferring the deviation is possible only until the final individual layer is the next but one individual layer.

Subsequently to a (i) positioning of a volume element in a discrete $x_{m+1}, y_{m+1}, z_{m+1} \ldots x_{n+1}, y_{n+1}, z_{n+1}$ position of the individual layer, or a (ii) not positioning of a volume element in a discrete $x_{m+1}, y_{m+1}, z_{m+1} \ldots x_{n+1}, y_{n+1}, z_{n+1}$ position of the individual layer an actual value of a layer thickness in a discrete $x_{m+1}, y_{m+1}, z_{m+1} \ldots x_{n+1}, y_{n+1}, z_{n+1}$ position of the individual layer is determined and compared to a default nominal value of the layer thickness the discrete $x_{m+1}, y_{m+1}, z_{m+1} \ldots x_{n+1}, y_{n+1}, z_{n+1}$ position of the individual layer. Typically, as mentioned before, a volume element is digitally represented as cuboid having preset edge lengths, typically as cube having a preset edge length. A deviation from the default nominal value is distributed to an adjacent discrete $x_{o+1}, y_{o+1}, z_{o+1} \ldots x_{p+1}, y_{p+1}, z_{p+1}$ position within the identical individual layer, and transferred to a discrete $x_{m+2}, y_{m+2}, z_{m+2} \ldots x_{n+2}, y_{n+2}, z_{n+2}$ position of a next but one individual layer.

Distributing the deviation to an adjacent discrete $x_{o+1}, y_{o+1}, z_{o+1} \ldots x_{p+1}, y_{p+1}, z_{p+1}$ position within the identical individual layer shall comprise distributing to one adjacent discrete $x_{o+1}, y_{o+1}, z_{o+1} \ldots x_{p+1}, y_{p+1}, z_{p+1}$ position or more adjacent $x_{o1+1}, y_{o1+1}, z_{o1+1} \ldots x_{p1+1}, y_{p1+1}, z_{p1+1}$ positions. Distribution the deviation shall mean that when determining an actual layer thickness in the discrete $x_{o+1}, y_{o+1}, z_{o+1} \ldots z_{p+1}, y_{p+1}, z_{p+1}$ position or in the discrete $x_{o1+1}, y_{o1+1}, z_{o1+1} \ldots x_{p1+1}, y_{p1+1}, z_{p1+1}$ positions the deviation is considered. In case the actual value of the layer thickness in the discrete $x_{m+1}, y_{m+1}, z_{m+1} \ldots x_{n+1}, y_{n+1}, z_{n+1}$ position of the individual layer is smaller than the default nominal value of the layer thickness in the a discrete $x_{m+1}, y_{m+1}, z_{m+1} \ldots x_{n+1}, y_{n+1}, z_{n+1}$ position then the deviation is considered for example in that in an adjacent discrete $x_{o+1}, y_{o+1}, z_{o+1} \ldots z_{p+1}, y_{p+1}, z_{p+1}$ position the difference in layer thickness is added to an actual layer thickness in the adjacent discrete $x_{o+1}, y_{o+1}, z_{o+1} \ldots z_{p+1}, y_{p+1}, z_{p+1}$ position. In case the actual value of the layer thickness in the discrete $x_{m+1}, y_{m+1}, z_{m+1} \ldots x_{n+1}, y_{n+1}, z_{n+1}$ position of the layer is larger than the default nominal value of the layer thickness in the a discrete $x_{m+1}, y_{m+1}, z_{m+1} \ldots x_{n+1}, y_{n+1}, z_{n+1}$ position then the deviation is considered for example in that in an adjacent discrete $x_{o+1}, y_{o+1}, z_{o+1} \ldots z_{p+1}, y_{p+1}, z_{p+1}$ position the difference in layer thickness is subtracted from an actual layer thickness in the adjacent discrete $x_{o+1}, y_{o+1}, z_{o+1} \ldots z_{p+1}, y_{p+1}, z_{p+1}$ position. In case the actual value of the layer thickness in the discrete $x_{m+1}, y_{m+1}, z_{m+1} \ldots x_{n+1}, y_{n+1}, z_{n+1}$ position of the layer is equal to the default nominal value of the layer thickness in the a discrete $x_{m+1}, y_{m+1}, z_{m+1} \ldots x_{n+1}, y_{n+1}, z_{n+1}$ position no transferring is needed.

Subsequently to the before described distribution of the deviation the computer-implemented method continues with and applies the step in the adjacent discrete $x_{o+1}, y_{o+1}, z_{o+1} \ldots z_{p+1}, y_{p+1}, z_{p+1}$ position, i.e., an actual value of a layer thickness in the discrete $x_{o+1}, y_{o+1}, z_{o+1} \ldots z_{p+1}, y_{p+1}, z_{p+1}$ position of the layer is determined 310 and compared to a default nominal value of the layer thickness a discrete $x_{o+1}, y_{o+1}, z_{o+1} \ldots z_{p+1}, y_{p+1}, z_{p+1}$ position of the individual layer. A deviation from the default nominal value is distributed to an adjacent discrete $x_{q+1}, y_{q+1}, z_{q+1} \ldots x_{r+1}, y_{r+1}, z_{r+1}$ position within the identical individual layer, and transferred to a discrete $x_{m+2}, y_{m+2}, z_{m+2} \ldots x_{n+2}, y_{n+2}, z_{n+2}$ position of a next but one individual layer.

The determination is continued until a deviation of an actual layer value of a thickness from a default nominal value of the layer thickness is determined for each discrete $x_{m+1}, y_{m+1}, z_{m+1} \ldots x_{n+1}, y_{n+1}, z_{n+1}$ position of the individual layer.

A sum of the deviation and the considered deviation distributed in an individual layer typically is zero to ensure that in an inkjet printed spectacle lens a total volume of ink droplets is equivalent to a volume of an individual layer to be inkjet printed.

Transferring the deviation to a discrete $x_{m+2}, y_{m+2}, z_{m+2} \ldots x_{n+2}, y_{n+2}, z_{n+2}$ position of a next but one individual layer shall mean that the deviation is considered in the next but one individual layer to typically position a volume element in the next but one individual layer in a discrete $x_{m+2b}, y_{m+2b}, z_{m+2b} \ldots x_{n+2b}, y_{n+2b}, z_{n+2b}$ position not on top of a volume element in a discrete $x_{m+1}, y_{m+1}, z_{m+1} \ldots x_{n+1}, y_{n+1}, z_{n+1}$ position of the individual layer. Thus, the transferring contributes to achieve a smoothest possible (i) interface within a spectacle lens or (ii) surface of a spectacle when the spectacle lens is typically inkjet printed in layers and ink droplets are positioned according to the positioning of volume elements a discrete $x_{m+2b}, y_{m+2b}, z_{m+2b} \ldots x_{n+2b}, y_{n+2b}, z_{n+2b}$ position.

In an exemplary embodiment of the disclosure, the computer-implemented method described before is further configured for manufacturing a spectacle lens.

In an exemplary embodiment of the disclosure, the computer-implemented method described before is further configured for manufacturing a spectacle lens by an additive manufacturing method.

In an exemplary embodiment of the disclosure, the computer-implemented method described before is further configured for inkjet printing a spectacle lens.

In an exemplary embodiment of the disclosure, a method for inkjet printing a spectacle lens in layers according to printing instructions which, when the printing instructions are executed by an inkjet printer, cause the inkjet printer to inkjet print the spectacle lens in layers, the printing instructions having been generated by the computer-implemented method as described before.

With respect to the previous four exemplary embodiments, reference is made to the above explanations given with respect to the computer-implemented method. These explanations and exemplary embodiments shall apply.

A computer according to the disclosure comprises a processor configured to perform the step:
determining a spatial variation of a layer thickness of each individual layer of a layer stack to achieve a predefined power distribution of a digital twin of a spectacle lens or a spectacle lens each by a spatial control of optical path lengths,
and an inkjet printer.

Reference is made to the above explanations given with respect to the computer-implemented method. These explanations and exemplary embodiments shall apply.

An apparatus comprising a computer and an inkjet printer, the computer comprising a processor configured to perform the step:
determining a spatial variation of a layer thickness of each individual layer of a layer stack to achieve a predefined power distribution of a digital twin of a spectacle lens by a spatial control of optical path lengths.

Reference is made to the above explanations given with respect to the computer-implemented method. These explanations and exemplary embodiments shall apply.

In an exemplary embodiment of the disclosure, a data processing system comprises a processor and a storage medium coupled to the processor, wherein the processor is adapted to perform the step:
determining a spatial variation of a layer thickness of each individual layer of a layer stack to achieve a predefined power distribution of a digital twin of a spectacle lens or a spectacle lens each by a spatial control of optical path lengths,
based on a computer program stored on the storage medium.

The computer program may be stored on a non-transitory tangible computer-readable storage medium, the computer program comprising instructions which, when the program is executed by a computer, cause the computer to carry out the computer-implemented method described before.

Reference is made to the above explanations given with respect to the computer-implemented method. These explanations and exemplary embodiments shall apply.

A computer program according to the disclosure comprises instructions which, when the program is executed by a computer, cause the computer to carry out the above-described computer-implemented method.

The computer program may be stored on a non-transitory tangible computer-readable storage medium, the computer program comprising instructions which, when the program is executed by a computer, cause the computer to carry out the above-described computer-implemented method.

In an exemplary embodiment of the disclosure, a computer-readable storage medium having stored thereon the computer program. The computer-readable storage medium may be a non-transitory tangible computer-readable storage medium.

In an exemplary embodiment of the disclosure, a computer-readable storage medium having stored thereon the digital twin of the spectacle lens configured to be fed to one or more manufacturing machines for manufacturing the spectacle lens.

In an exemplary embodiment of the disclosure, a computer-readable storage medium having stored thereon the digital twin of the spectacle lens configured to be fed to one or more inkjet printers for inkjet printing the spectacle lens.

In an exemplary embodiment of the disclosure, a data signal is carrying the computer program.

In an exemplary embodiment of the disclosure, a data signal is carrying the digital twin of the spectacle lens configured to be fed to one or more manufacturing machines for manufacturing the spectacle lens.

In an exemplary embodiment of the disclosure, a data signal is carrying the digital twin of the spectacle lens configured to one or more inkjet printers for inkjet printing the spectacle lens.

A spectacle lens according to the disclosure is having
a predefined power distribution, and
a layer stack with a plurality of individual layers each having a non-uniform layer thickness with a spatial variation and a uniform refractive index, the layer stack comprises at least
  a first plurality of individual layers each having a non-uniform layer thickness with a spatial variation and a first uniform refractive index,
  a second plurality of individual layers each having a non-uniform layer thickness with a spatial variation and a second uniform refractive index, the second uniform refractive index being different to the first uniform refractive index,
and all interfaces between individual layers of the first plurality of individual layers and the second plurality of individual layers are contributing to the predefined power distribution in at least one of the following ranges selected from:
5% to 25%,
10% to 20%,
12% to 18%.

All interfaces are interfaces within a layer stack of a spectacle lens, not considering a front surface and a back surface of the spectacle lens.

Each interface separating two individual layers, each individual layer having a non-uniform layer thickness with a spatial variation and a uniform refractive index, whereby the uniform refractive indices of the two individual layers are different from each other, contributes to a predefined power distribution of a spectacle lens. Therefore, an interface power distribution is caused by each interface separating two individual layers having a different uniform refractive index and each having a non-uniform layer thickness with a spatial variation.

An interface between
a first individual layer having a first non-uniform layer thickness with a first spatial variation and a first uniform refractive index, the first individual layer being separated by the interface from
a second individual layer having a second non-uniform layer thickness with a second spatial variation and a second uniform refractive index, wherein the second spatial variation is different from the first spatial variation and the second uniform refractive index is different from the first uniform refractive index,
causes an interface power distribution.

Interfaces between
a first individual layer having a first non-uniform layer thickness with a first spatial variation and a first uniform refractive index, the first individual layer being separated by a first interface from
a second individual layer having a second non-uniform layer thickness with a second spatial variation and a second uniform refractive index, the second uniform refractive index being different to the first uniform refractive index, the second spatial variation being different to the first spatial variation and a third spatial variation of a third non-uniform layer thickness of a third individual layer, the second individual layer being separated by a second interface from
the third individual layer having the third non-uniform layer thickness with the third spatial variation and a uniform refractive index, the uniform refractive index being different to the second uniform refractive index and same as the first uniform refractive index, the third spatial variation may be identical to the first spatial variation,
cause interface power distributions.

The before exemplarily described for two or three individual layers shall apply by analogy for each interface of the layer stack of the spectacle lens separating individual layers having a non-uniform layer thickness with a spatial variation and a different uniform refractive index.

A front surface and a back surface of the spectacle lens cause a surface power distribution and thus contributes to the predefined power distribution.

The predefined power distribution is a sum of the surface power distribution caused by the front surface and the back surface of the spectacle lens and the interface power distributions caused by each interface of the layer stack of the spectacle lens which separates two individual layers, each having a non-uniform layer thickness with a spatial variation, the two individual layers having a uniform refractive index which is different from each other.

For example, a difference in refractive index of a first individual layer having a first refractive index and a second individual layer having a second refractive index of 0.1, the first and second individual layer having a non-uniform layer thickness with a spatial variation, causes at each interface of a layer stack of a spectacle lens an interface power distribution which contributes with a total interface power distribution of 20% to the predefined power distribution of the spectacle lens.

Typically, a non-uniform layer thickness comprises a spatial variation selected from one of the following spatial variations:
at least 500%;
at least 800%;
at least 1000%;
at least 1200%;
at least 1500%.

The spatial variations shall comprise typical spatial variations of non-uniform layer thicknesses of individual layers, typically including a minimum layer thickness and a maximum layer thickness. At least one of the before mentioned spatial variations typically is realized in at least 90%, further typically at least 92%, more typically at least 95% of all individual layers of the layer stack of the spectacle lens. Typically, the spatial variation of a non-uniform layer thickness of an individual layer is beginning with one of the spatial variations mentioned before and is up to a maximum of 2000%, typically up to a maximum of 2500%. The spatial variations of different individual layers may be a same spatial variation or may be a different spatial variation.

The distances described in WO 2020/16539 A1, page 22, lines 20 to 24, of adjacent interfaces between layers adjoining one another vary by a maximum of 30%, 20%, 10%, 5%, 3%, 2%, 1%. A spatial variation of a non-uniform layer thickness is not sufficient to contribute to a predefined power distribution. Further, a spatial variation of a non-uniform layer thickness of maximum 30% in combination with a refractive index difference between individual layers of at most 0.2, as described in WO 2020/16539 A1, page 2, line 30 to page 3, line 6, is not sufficient to contribute to a predefined power distribution.

In an exemplary embodiment of the disclosure, a spectacle lens is having
a predefined power distribution, and
a layer stack with a plurality of individual layers each having a non-uniform layer thickness with a spatial variation and a uniform refractive index, the layer stack comprises at least
a first plurality of individual layers each having a non-uniform layer thickness with a spatial variation and a first uniform refractive index,
a second plurality of individual layers each having a non-uniform layer thickness with a spatial variation and a second uniform refractive index, the second uniform refractive index being different to the first uniform refractive index,
a third plurality of individual layers each having a non-uniform layer thickness with a spatial variation and a third uniform refractive index, the third uniform refractive index being different to the first uniform refractive index and to the second uniform refractive index,
and all interfaces between individual layers of the first plurality of individual layers and the second plurality of individual layers are contributing to the predefined power distribution in at least one of the following ranges selected from:
5% to 25%,
10% to 20%,
12% to 18%.

As mentioned before, each interface separating two individual layers, each of the two individual layers having a non-uniform layer thickness with a spatial variation and a uniform refractive index, the uniform refractive index of one individual layer being different from the uniform refractive index of the other individual layer, contributes to a predefined power distribution of a spectacle lens.

Interfaces between
a first individual layer having a first non-uniform layer thickness with a first spatial variation and a first uniform refractive index, the first individual layer being separated by a first interface from
a second individual layer having a second non-uniform layer thickness with a second spatial variation and a second uniform refractive index, the second spatial variation being different to the first spatial variation and the second spatial variation being different to a third spatial variation of a third individual layer having the third spatial variation and a third uniform refractive index, the second individual layer being separated by a second interface from the third individual layer having the third non-uniform layer thickness and the third refractive index, the third spatial variation may be identical to the first spatial variation, cause at the first interface and the second interface a first and a second interface power distribution, i.e., interface power distributions.

Interfaces between a first individual layer having a first non-uniform layer thickness with a first spatial variation and a first refractive index, the first individual layer being separated by a first interface from a second individual layer having a second non-uniform layer thickness with a second spatial variation and a second refractive index, the second refractive index being different to the first uniform refractive index, the second spatial variation being different to the first spatial variation and the second spatial variation being different to a third spatial variation of a third individual layer having the third spatial variation and a third refractive index, the second individual layer being separated by a second interface from the third individual layer having the third non-uniform layer thickness with the third spatial variation and the third uniform refractive index, the third refractive index being different to the first refractive and to the second refractive index, the third spatial variation being different to a fourth spatial variation of a fourth individual layer having a fourth non-uniform layer thickness with the fourth spatial variation and a fourth refractive index, the third individual layer being separated by a third interface from the fourth individual layer having the fourth non-uniform layer thickness with the fourth spatial variation and the fourth uniform refractive index, the fourth uniform refractive being a) different to the third uniform refractive index and b) same as either the first refractive index or the second refractive index, the fourth spatial variation being A) different to the third spatial variation and B) identical to either the first spatial variation or the second spatial variation, cause at the first interface, at the second interface and at the third interface a first, second and third interface power distribution, i.e., interface power distributions.

The before exemplarily described for three or four individual layers shall apply by analogy for each interface of the layer stack of the spectacle lens separating individual layers having a non-uniform layer thickness with a spatial variation and a different uniform refractive index.

As mentioned before, a front surface and a back surface of the spectacle lens cause a surface power distribution and thus also contributes to the predefined power distribution, the predefined power distribution is a sum of the surface power distribution caused by the front surface and the back surface of the spectacle lens and the interface power distributions caused by each interface of the layer stack of the spectacle lens which separates two individual layers, each having a non-uniform layer thickness with a spatial variation, the two individual layers having a uniform refractive index which is different from each other.

A spectacle lens having a predefined power distribution, and a layer stack with a plurality of individual layers each having a non-uniform layer thickness with a spatial variation and a uniform refractive index, the layer stack comprising individual layers having a different uniform refractive index, is wherein a ratio of a minimum layer thickness and a maximum layer thickness of each individual layer being selected from at least one of the following:

a) a ratio of a minimum layer thickness to a maximum layer thickness of at least 1:5;

b) a ratio of a minimum layer thickness to a maximum layer thickness of at least 1:8;

c) a ratio of a minimum layer thickness to a maximum layer thickness of at least 1:10;

d) a ratio of a minimum layer thickness to a maximum layer thickness of at least 1:12;

e) a ratio of a minimum layer thickness to a maximum layer thickness of at least 1:15.

The layer stack may comprise at least a first plurality of individual layers each having a non-uniform layer thickness with a spatial variation and a first uniform refractive index, a second plurality of individual layers each having a non-uniform layer thickness with a spatial variation and a second uniform refractive index, the second uniform refractive index being different to the first uniform refractive index, a third plurality of individual layers each having a non-uniform layer thickness with a spatial variation and a third uniform refractive index, the third uniform refractive index being different to the first uniform refractive index and to the second uniform refractive index.

Reference is made to the above explanations given with respect to the computer-implemented method and the spectacle lens. These explanations and exemplary embodiments shall apply.

In an exemplary embodiment of the disclosure, a spectacle lens is having a predefined power distribution, and a layer stack with a plurality of individual layers each having a non-uniform layer thickness with a spatial variation and a uniform refractive index, the predefined power distribution is achieved by a ratio of a minimum layer thickness and a maximum layer thickness of each individual layer being selected from at least one of the following:

a) a ratio of a minimum layer thickness to a maximum layer thickness of at least 1:5;

b) a ratio of a minimum layer thickness to a maximum layer thickness of at least 1:8;

c) a ratio of a minimum layer thickness to a maximum layer thickness of at least 1:10;

d) a ratio of a minimum layer thickness to a maximum layer thickness of at least 1:12;

e) a ratio of a minimum layer thickness to a maximum layer thickness of at least 1:15.

A spectacle lens comprising a layer stack with a plurality of individual layers each having a non-uniform layer thickness with a spatial variation and a uniform refractive index, whereby the spatial variation of a layer thickness of an individual layer to comprise one of the before mentioned ratios between a minimum layer thickness and a maximum layer thickness advantageously enables to transfer a digital twin of the spectacle lens, typically calculated according to the before described computer-implemented method, into physical reality. The digital twin is typically transferred to physical reality by an additive manufacturing method, further typically by inkjet printing the spectacle lens. For the ratios the before described advantages described with respect to the computer-implemented method shall apply.

In an exemplary embodiment of the disclosure, a spectacle lens is a coated spectacle lens, the coated spectacle lens as defined in ISO 13666:2019(E), section 3.18.1, as lens (3.5.2) to which one or more surface layers have been added to alter one or more properties of the lens. The one or more surface layers may be selected from at least one of a hard coating as defined ISO 13666:2019(E), section 3.18.2, a anti-reflective coating as defined in ISO 13666:2019(E), section 3.18.3, a clean coating as defined in ISO 13666:2019(E), section 3.18.4, a hydrophobic coating as defined in ISO 13666:2019(E), section 3.18.5, a hydrophilic coating as defined in ISO 13666:2019(E), section 3.19.6, an anti-fog coating as defined in ISO 13666:2019(E), section 3.19.7, an anti-static coating as defined in ISO 13666:2019(E), section 3.18.8.

In an exemplary embodiment of the disclosure, a data set comprising at least one kind of the following kinds of data: (i) a digital twin of the spectacle lens configured to be fed to one or more manufacturing machine(s) for manufacturing the spectacle lens or (ii) data containing computer-readable instructions for controlling one or more manufacturing machine(s) to manufacture the spectacle lens or (iii) a digital twin of the spectacle lens for the purpose of a use of the digital twin for a manufacture of the spectacle lens.

Typically, the data set comprises at least one kind of the before mentioned kinds of computer-readable data. The digital twin of the spectacle lens is configured for the purpose of a use of the digital twin for a manufacture of a spectacle lens.

In an exemplary embodiment of the disclosure, a data set (i) in the form of a computer-readable data signal or (ii) stored on a computer-readable medium or (iii) comprising computer-readable data, the data set comprising at least one kind of the following kinds of data: (i) a digital twin of the spectacle lens configured to be fed to one or more manufacturing machine(s) for manufacturing the spectacle lens or (ii) data containing computer-readable instructions for controlling one or more manufacturing machine(s) to manufacture the spectacle lens or (iii) a digital twin of the spectacle lens for the purpose of a use of the digital twin for a manufacture of the spectacle lens.

The digital twin of the spectacle lens is configured for the purpose of a use of the digital twin for a manufacture of a spectacle lens.

In an exemplary embodiment of the disclosure, a data set comprising at least one kind of the following kinds of data: (i) a digital twin of the spectacle lens configured to be fed to one or more inkjet printer(s) for inkjet printing the spectacle lens or (ii) data containing computer-readable instructions for controlling one or more inkjet printer(s) to inkjet print the spectacle lens or (iii) a digital twin of the spectacle lens for the purpose of a use of the digital twin for a inkjet printing the spectacle lens.

The digital twin of the spectacle lens is configured for the purpose of a use of the digital twin for inkjet printing a spectacle lens.

In an exemplary embodiment of the disclosure, a data set (i) in the form of a computer-readable data signal or (ii) stored on a computer-readable medium or (iii) comprising computer-readable data, the data set comprising at least one kind of the following kinds of data: (i) a digital twin of the spectacle lens configured to be fed to one or more inkjet printer(s) for inkjet printing the spectacle lens or (ii) data containing computer-readable instructions for controlling one or more inkjet printer(s) to inkjet print the spectacle lens or (iii) a digital twin of the spectacle lens for the purpose of a use of the digital twin for a inkjet printing the spectacle lens.

The digital twin of the spectacle lens is configured for the purpose of a use of the digital twin for inkjet printing a spectacle lens.

A non-transitory tangible computer-readable storage medium may comprise or carry a data set according to the previous four exemplary embodiments.

In an exemplary embodiment of the disclosure, a data set of computer-readable printing instructions is configured to be used for inkjet printing a spectacle lens, the data set being (i) stored on a computer-readable storage medium or (ii) transferred via a data signal. The computer-readable storage medium may be a non-transitory tangible computer-readable storage medium. A non-transitory tangible computer-readable storage medium may comprise or carry the data set. The data set is for the purpose of a use thereof for inkjet printing a spectacle lens.

The data set comprises printing instructions which have been generated as described before. The data set comprises printing instructions which have been generated by a) slicing a digital twin of a spectacle lens into a layer stack, b) converting each layer of the layer stack into a spatial volume element pattern, and c) transferring spatial volume element pattern into printing instruction which, when the printing instructions are executed by an inkjet printer, cause the inkjet printer to inkjet print a spectacle lens in layers.

Each definition given in this application, in particular each definition set in quotation marks, shall apply throughout the whole application.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method being configured for calculating a digital twin of a spectacle lens for the purpose of a use of the digital twin for a manufacture of the spectacle lens, the digital twin of the spectacle lens having a predefined power distribution and containing a layer stack with a plurality of individual layers, each layer having a non-uniform layer thickness with a spatial variation and a uniform refractive index, the layer stack comprising individual layers having a different uniform refractive index, respectively, the method comprising the step of:

determining the spatial variation of the layer thicknesses of the individual layers to achieve the predefined power distribution of the digital twin of the spectacle lens by a spatial control of optical path lengths such that an optical path length through the layer stack is equal to an optical path length through the digital twin in an identical position or in an identical discrete position.

2. The method according to claim 1, wherein the layer stack comprises:
   a first plurality of individual layers each having the non-uniform layer thickness with the spatial variation and a first uniform refractive index; and
   a second plurality of individual layers each having the non-uniform layer thickness with the spatial variation and a second uniform refractive index, the second uniform refractive index being different from the first uniform refractive index.

3. The method according to claim 2, wherein the method further comprises at least one of the steps of:
   calculating a transition zone between a first individual layer having the first uniform refractive index and a second individual layer having the second uniform refractive index, the transition zone having a refractive index gradient; or
   calculating the transition zone between the second individual layer having the second uniform refractive index and the first individual layer having the first uniform refractive index, the transition zone having the refractive index gradient.

4. The method according to claim 1, wherein the spatial variation of the layer thickness of the individual layer comprises a minimum layer thickness and a maximum layer thickness having a ratio selected from at least one of the following:
   a) the ratio of the minimum layer thickness to the maximum layer thickness of at least 1:5;
   b) the ratio of the minimum layer thickness to the maximum layer thickness of at least 1:8;
   c) the ratio of the minimum layer thickness to the maximum layer thickness of at least 1:10;
   d) the ratio of the minimum layer thickness to the maximum layer thickness of at least 1:12; and
   e) the ratio of the minimum layer thickness to the maximum layer thickness of at least 1:15.

5. The method according to claim 1, the method further comprising the step of:
   determining the spatial variation such that an optical path length through a pair of adjacent individual layers, each of the adjacent individual layers having the uniform refractive index, which is different from each other, respectively, equals in each position the optical path length through a respective gradient index layer, wherein the respective gradient-index layer a gradient index is given between the uniform refractive indices of the adjacent individual layers.

6. The method according to claim 1, the method further comprising the step of:
   determining the spatial variation such that a form of an interface is a linear combination of a shape of the front surface of the spectacle lens and a shape of the back surface of the spectacle lens.

7. The method according to claim 6, the method further comprising:
   considering the uniform refractive index of the individual layer and a different uniform refractive index of an adjacent individual layer having the interface in common.

8. The method according to claim 1, further comprising the additional steps:
   determining a deviation of an actual value of the layer thickness in a discrete $x_m, y_m, z_m \ldots x_n, y_n, z_n$ position of the individual layer from a default nominal value of the layer thickness in an identical discrete $x_m, y_m, z_m \ldots x_n, y_n, z_n$ position of the individual layer; and
   determining a sum of the deviation and the actual value of the layer thickness, wherein one of the following conditions applies:
   when the sum is larger than half the default nominal value of the layer thickness, then no volume element is positioned in the discrete $x_{m+1}, y_{m+1}, z_{m+1} \ldots x_{n+1}, y_{n+1}, z_{n+1}$ position of the individual layer; or
   when the sum is smaller than or equal to half the default nominal value of the layer thickness then the volume element is positioned in the discrete $x_{m+1}, y_{m+1}, z_{m+1} \ldots x_{n+1}, y_{n+1}, z_{n+1}$ position of the individual layer.

9. The method according to claim 8, further comprising at least one of the steps selected from:
   determining a deviation of the default nominal value of the layer thickness in the discrete $x_{m+1}, y_{m+1}, z_{m+1} \ldots x_{n+1}, y_{n+1}, z_{n+1}$ position of the individual layer following the positioning of the volume element and distributing the deviation to an adjacent discrete $x_{o+1}, y_{o+1}, z_{o+1} \ldots x_{p+1}, y_{p+1}, z_{p+1}$ position within the identical individual layer;
   determining the deviation of the default nominal value of the layer thickness in the discrete $x_{m+1}, y_{m+1}, z_{m+1} \ldots x_{n+1}, y_{n+1}, z_{n+1}$ position of the individual layer following the positioning of the volume element and transferring the deviation to the discrete $x_{m+2}, y_{m+2}, z_{m+2} \ldots x_{n+2}, y_{n+2}, z_{n+2}$ position of a next but one individual layer;
   determining the deviation of the default nominal value of the layer thickness in the discrete $x_{m+1}, y_{m+1}, z_{m+1} \ldots x_{n+1}, y_{n+1}, z_{n+1}$ position of the individual layer following the non-positioning of the volume element and distributing the deviation to the adjacent discrete $x_{o+1}, y_{o+1}, z_{o+1} \ldots x_{p+1}, y_{p+1}, z_{p+1}$ position within the identical individual layer; and
   determining the deviation of the default nominal value of the layer thickness in the discrete $x_{m+1}, y_{m+1}, z_{m+1} \ldots x_{n+1}, y_{n+1}, z_{n+1}$ position of the individual layer following the non-positioning of the volume element and transferring the deviation to the discrete $x_{m+2}, y_{m+2}, z_{m+2} \ldots x_{n+2}, y_{n+2}, z_{n+2}$ position of the next but one individual layer.

10. The method according to claim 1, the method further being configured for manufacturing a spectacle lens.

11. A computer program comprising instructions which, when the program is executed by a computer, cause the computer to carry out the method of claim 1.

12. An apparatus comprising a computer and an inkjet printer, the computer comprising a processor configured to perform the step of:
   determining a spatial variation of a layer thickness of each individual layer of a layer stack to achieve a predefined power distribution of a digital twin of a spectacle lens by a spatial control of optical path lengths such that an optical path length through the layer stack is equal to an optical path length through the digital twin in an identical position or in an identical discrete position,
   wherein the computer is configured to send executable instructions to the inkjet printer, and
   wherein the executable instructions, when executed, cause the inkjet printer to print the spectacle lens in layers.

13. A spectacle lens comprising:
a predefined power distribution; and
a layer stack with a plurality of individual layers, each layer having a non-uniform layer thickness with a spatial variation and a uniform refractive index, respectively, the layer stack having at least:
- a first plurality of individual layers each having the non-uniform layer thickness with the spatial variation and a first uniform refractive index; and
- a second plurality of individual layers each having the non-uniform layer thickness with the spatial variation and a second uniform refractive index, the second uniform refractive index being different from the first uniform refractive index, wherein
all interfaces between individual layers of the first plurality of individual layers and the second plurality of individual layers are configured to contribute to the predefined power distribution in at least one of the following ranges selected from:
5% to 25%;
10% to 20%; and
12% to 18%.

14. The spectacle lens according to claim 13, wherein the spatial variation is selected from one of the following spatial variations including a minimum layer thickness and a maximum layer thickness:
the spatial variation of at least 500%;
the spatial variation of at least 800%;
the spatial variation of at least 1000%;
the spatial variation of at least 1200%; and
the spatial variation of at least 1500%.

15. A data set comprising at least one kind of the following kinds of data:
(i) data containing computer-readable instructions for controlling one or more manufacturing machines to manufacture the spectacle lens according to claim 13, or
a digital twin of the spectacle lens according to claim 13 configured for the purpose of a use of the digital twin for a manufacture of the spectacle lens according to claim 13.

16. A spectacle lens comprising:
a predefined power distribution; and
a layer stack with a plurality of individual layers, each layer having a non-uniform layer thickness with a spatial variation and a uniform refractive index, the layer stack containing individual layers having a different uniform refractive index, respectively, wherein
a ratio of a minimum layer thickness and a maximum layer thickness of each individual layer is selected from at least one of the following:
a) the ratio of the minimum layer thickness to the maximum layer thickness of at least 1:5;
b) the ratio of the minimum layer thickness to the maximum layer thickness of at least 1:8;
c) the ratio of the minimum layer thickness to the maximum layer thickness of at least 1:10;
d) the ratio of the minimum layer thickness to the maximum layer thickness of at least 1:12; and
e) the ratio of the minimum layer thickness to the maximum layer thickness of at least 1:15.

* * * * *

UNITED STATES PATENT AND TRADEMARK OFFICE
CERTIFICATE OF CORRECTION

PATENT NO. : 12,468,179 B2
APPLICATION NO. : 19/191092
DATED : November 11, 2025
INVENTOR(S) : Martin Reese and Christoph Menke Page 1 of 1

It is certified that error appears in the above-identified patent and that said Letters Patent is hereby corrected as shown below:

In the Specification

In Column 22, Line 29: change "interface" to -- interface, --

In Column 22, Line 54: change "comprises" to -- comprise --

Signed and Sealed this
Twenty-seventh Day of January, 2026

John A. Squires
*Director of the United States Patent and Trademark Office*